United States Patent
Ramamurti et al.

(10) Patent No.: US 10,852,023 B2
(45) Date of Patent: Dec. 1, 2020

(54) BUILDING MANAGEMENT AUTONOMOUS HVAC CONTROL USING REINFORCEMENT LEARNING WITH OCCUPANT FEEDBACK

(71) Applicant: Johnson Controls Technology Company, Auburn Hills, MI (US)

(72) Inventors: Viswanath Ramamurti, San Leandro, CA (US); Young M. Lee, Old Westbury, NY (US); Youngchoon Park, Brookfield, WI (US); Sugumar Murugesan, Santa Clara, CA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/980,547

(22) Filed: May 15, 2018

(65) Prior Publication Data

US 2019/0353378 A1 Nov. 21, 2019

(51) Int. Cl.
*F24F 11/50* (2018.01)
*F24F 11/65* (2018.01)
*G05B 13/02* (2006.01)
*F24F 120/20* (2018.01)
*F24F 120/12* (2018.01)

(52) U.S. Cl.
CPC .............. *F24F 11/50* (2018.01); *F24F 11/65* (2018.01); *G05B 13/0265* (2013.01); *F24F 2120/12* (2018.01); *F24F 2120/20* (2018.01)

(58) Field of Classification Search
CPC .. F24F 11/30; F24F 11/50; F24F 11/62; F24F 11/65; F24F 2120/12; F24F 2120/20; G05B 13/0265; G05B 15/02; G05B 2219/23386; G05B 2219/2614; G05B 2219/2642
See application file for complete search history.

(56) References Cited

U.S. PATENT DOCUMENTS

| 10,047,970 B2 * | 8/2018 | Nelson ..................... F24F 11/30 |
| 2001/0001318 A1 | 5/2001 | Kamiya et al. |
| 2010/0138250 A1 * | 6/2010 | Brown ................. G06Q 10/063 705/7.11 |

(Continued)

OTHER PUBLICATIONS

Amazon, Alexa for Business, https://aws.amazon.com/alexaforbusiness/, retrieved May 14, 2018, 9 pages.

(Continued)

*Primary Examiner* — Abdelmoniem I Elamin
(74) *Attorney, Agent, or Firm* — Foley & Lardner LLP

(57) ABSTRACT

A building management system includes one or more processors, and one or more computer-readable storage media communicably coupled to the one or more processors and having instructions stored thereon that cause the one or more processors to: define a state of a zone or space within a building; control an HVAC system to adjust a temperature of the zone or space corresponding to a first action; receive utterance data from a voice assist device located in the zone or space; analyze the utterance data to identify a sentiment relating to the temperature of the zone or space; calculate a reward based on the state, the first action, and the sentiment; determine a second action to adjust the temperature of the zone or space based on the reward; and control the HVAC system to adjust the temperature of the zone or space corresponding to the second action.

20 Claims, 13 Drawing Sheets

(56) References Cited

U.S. PATENT DOCUMENTS

| | | | |
|---|---|---|---|
| 2015/0053780 A1* | 2/2015 | Nelson | F24F 11/30 |
| | | | 236/1 C |
| 2016/0223218 A1 | 8/2016 | Barrett | |
| 2018/0024520 A1 | 1/2018 | Sinha et al. | |
| 2018/0048627 A1* | 2/2018 | Reese | H04L 63/02 |
| 2018/0100662 A1 | 4/2018 | Farahmand et al. | |
| 2018/0120776 A1* | 5/2018 | Billings | G05B 13/0265 |
| 2018/0173195 A1* | 6/2018 | Katole | G05B 19/409 |
| 2018/0301006 A1* | 10/2018 | Flint | H04M 1/0291 |
| 2019/0013023 A1* | 1/2019 | Pourmohammad | G06F 3/167 |
| 2019/0107307 A1* | 4/2019 | Kring | F24F 11/56 |

OTHER PUBLICATIONS

Barrett et al., Autonomous HVAC Control, A Reinforcement Learning Approach, Aug. 29, 2015, 17 pages.
IP Watchdog, Amazon, Google, Microsoft and Apple will lead intelligent virtual assistant sector over the next few years, http://www.ipwatchdog.com/2017/03/28/amazon-google-microsoft-apple-intelligent-virtual-assistant/id=78846/, Mar. 28, 2017, 9 pages.
Nest, Nest Learning Thermostat: https://nest.com/thermostats/nest-learning-thermostat/overview/, retrieved May 14, 2018, 13 pages.
PG&E, Ways HVAC Occupancy Sensors Can Save Your Business Money, https://www.pge.com/en_US/business/resources/tips-trends-and-incentives/energy-insights/past-articles/ways-hvac-occupancy-sensors-can-save-money.page, Sep. 4, 2014, 5 pages.
International Search Report and Written Opinion on PCT/US2019/026932, dated Dec. 2, 2019, 14 pages.

* cited by examiner

BUILDING MANAGEMENT AUTONOMOUS HVAC CONTROL USING REINFORCEMENT LEARNING WITH OCCUPANT FEEDBACK

BACKGROUND

The present disclosure relates generally to the field of building management systems. A building management system (BMS) is, in general, a system of devices configured to control, monitor, and manage equipment in or around a building or building area. A BMS can include, for example, a HVAC (heating, ventilation, and air conditioning) system, a security system, a lighting system, a fire alerting system, and/or any other system that is capable of managing building functions or devices. HVAC systems are responsible for 40% to 60% of total commercial building energy consumption, while commercial buildings consume a significant portion of the world's total energy supply.

Generally, an HVAC system controls the temperature of a building, zone, or space based on a temperature set-point. Some HVAC systems include a programmable thermostat that allows operations of heating and cooling according to a schedule and a pre-programmed temperature set-point. For example, programmable thermostats can be pre-programmed for "comfortable" set-points such as 68 degree Fahrenheit during the winter and 78 degree Fahrenheit during the summer for normal operations. Occupants can override these pre-programmed set-points by entering their own set-points. On the other hand, manual thermostats are non-programmable, and generally require a human to turn on and off the functions of heating and cooling as desired or required. Programmable thermostats can conserve energy consumption over manual thermostats. For example, occupants do not normally adjust thermostat settings each time they enter or leave a zone or space within a building, whereas a programmable thermostat can be programmed, for example, to run the HVAC system during working hours, while shutting down the HVAC system during non-working hours.

Some modern or advanced HVAC systems can be pre-programmed with different temperature set-points according to various conditions, such as time of day, day of week, outside temperature, or even occupancy status. These HVAC systems can adjust the temperature depending on the pre-programmed set-point for the corresponding condition. Further, $CO_2$ sensors, motion sensors, and/or other sensors may be used to detect the occupancy status of a zone or space within a building. However, these sensors may not always provide reliable data. For example, these sensors could provide false-positives, which can cause an unoccupied zone or space to be unnecessarily heated or cooled. Heating or cooling a zone or space when there are no occupants in the zone or space can lead to energy waste.

The above information disclosed in this Background section is for enhancement of understanding of the background of the invention, and therefore, it may contain information that does not constitute prior art.

SUMMARY

Various embodiments utilize voice assist devices to control the temperature using occupants as sensors.

One implementation of the present disclosure is a building management system including a voice assist device, one or more processors, and one or more computer-readable storage media communicably coupled to the one or more processors. The one or more computer-readable storage media have instructions stored thereon that, when executed by the one or more processors, cause the one or more processors to define a state of a zone or space within a building, control an HVAC system to adjust a temperature of the zone or space corresponding to a first action, receive utterance data from the voice assist device located in the zone or space, analyze the utterance data to identify a sentiment relating to the temperature of the zone or space, calculate a reward based on the state, the first action, and the sentiment, determine a second action to adjust the temperature of the zone or space based on the reward, and control the HVAC system to adjust the temperature of the zone or space corresponding to the second action.

In some embodiments, the voice assist device may be configured to detect a natural language statement uttered by an occupant at the zone or space, and the utterance data may correspond to the natural language statement.

In some embodiments, the voice assist device may be a stationary device or a mobile device.

In some embodiments, the second action may be determined in order to increase the reward.

In some embodiments, each state may define a condition of the zone or space.

In some embodiments, the condition may include at least an occupancy status of the zone or space, a current temperature of the zone or space, and a temperature set-point of the zone or space.

In some embodiments, the voice assist device may be configured to detect the occupancy status of the zone or space.

In some embodiments, each of the first and second actions may include one of turning heat on, turning heat of, turning cooling on, or turning cooling off.

In some embodiments, each of the first and second actions may be executed irrespective of the temperature set-point.

In some embodiments, each of the first and second actions may include changing a temperature set-point of the zone or space, and the HVAC system may adjust the temperature of the zone or space based on the changed temperature set-point.

In some embodiments, the temperature set-point of the second action may be determined to increase the reward.

In some embodiments, the temperature set-point of the zone or space may be calculated based on historical utterance data.

Another implementation of the present disclosure is a method for controlling an HVAC system. The method includes defining, by one or more processors, a state of a zone or space within a building, controlling, by the one or more processors, an HVAC system to adjust a temperature of the zone or space corresponding to a first action, receiving, by the one or more processors, utterance data from a voice assist device located in the zone or space, analyzing, by the one or more processors, the utterance data to identify a sentiment relating to the temperature of the zone or space, calculating, by the one or more processors, a reward based on the state, the first action, and the sentiment, determining, by the one or more processors, a second action to adjust the temperature of the zone or space based on the reward, and controlling, by the one or more processors, the HVAC system to adjust the temperature of the zone or space corresponding to the second action.

In some embodiments, the method may further include detecting, by the voice assist device, a natural language statement uttered by an occupant at the zone or space, and the utterance data corresponds to the natural language statement.

In some embodiments, the voice assist device may be a stationary device or a mobile device.

In some embodiments, the second action may be determined in order to increase the reward.

In some embodiments, each state may define a condition of the zone or space.

In some embodiments, the condition may include at least an occupancy status of the zone or space, a current temperature of the zone or space, and a temperature set-point of the zone or space.

In some embodiments, the method may further include detecting, by the voice assist device, the occupancy status of the zone or space.

In some embodiments, each of the first and second actions may include one of turning heat on, turning heat of, turning cooling on, or turning cooling off.

In some embodiments, each of the first and second actions may be executed, by the HVAC system, irrespective of the temperature set-point.

In some embodiments, each of the first and second actions may include changing a temperature set-point of the zone or space, and the HVAC system may adjust the temperature of the zone or space based on the changed temperature set-point.

In some embodiments, the determining of the second action may include determining the temperature set-point to increase the reward.

In some embodiments, the method may further include calculating, by the one or more processors, the temperature set-point of the zone or space based on historical utterance data.

Another implementation of the present disclosure is one or more non-transitory computer readable media containing program instructions. When executed by one or more processors, the instructions cause the one or more processors to perform operations including defining a state of a zone or space within a building, controlling an HVAC system to adjust a temperature of the zone or space corresponding to a first action, receiving utterance data from a voice assist device located in the zone or space, analyzing the utterance data to identify a sentiment relating to the temperature of the zone or space, calculating a reward based on the state, the first action, and the sentiment, determining a second action to adjust the temperature of the zone or space based on the reward, and controlling the HVAC system to adjust the temperature of the zone or space corresponding to the second action.

In some embodiments, the operations may include determining a natural language statement uttered by an occupant at the zone or space from the utterance data.

In some embodiments, the voice assist device may be a stationary device or a mobile device.

In some embodiments, the second action may be determined in order to increase the reward.

In some embodiments, each state may define a condition of the zone or space.

In some embodiments, the condition may include at least an occupancy status of the zone or space, a current temperature of the zone or space, and a temperature set-point of the zone or space.

In some embodiments, the operations may include receiving an occupancy status of the zone or space from the voice assist device.

In some embodiments, each of the first and second actions may include one of turning heat on, turning heat of, turning cooling on, or turning cooling off.

In some embodiments, each of the first and second actions may be executed irrespective of the temperature set-point.

In some embodiments, each of the first and section actions may include changing a temperature set-point of the zone or space, and the HVAC system may adjust the temperature of the zone or space based on the changed temperature set-point.

In some embodiments, the determining of the second action may include determining the temperature set-point to increase the reward.

In some embodiments, the operations may include calculating the temperature set-point of the zone or space based on historical utterance data.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Hereinafter, example embodiments will be described in more detail with reference to the accompanying drawings.

Overview

According to various embodiments, one or more voice assist devices are used to control an HVAC system, while reducing or minimizing energy consumption or costs. Voice assist devices, such as those powered by Alexa, Google Assistant, Siri, Cortana, and Bixby, are gaining popularity for playing music, checking the weather, catching up on the news, setting reminders, making phone calls, sending text messages, controlling home appliances, and the like. Voice assist devices can be stand-alone devices, such as a smart speaker (e.g., a speaker with a receiver generally having a connection to a data communication network), or may be an application running on a mobile or desktop device, such as a smart phone, tablet, laptop, or desktop computer. Voice assist devices generally listen (or monitor) for spoken statements (or verbal commands), that are processed at the back-end to trigger an appropriate response.

According to various embodiments, one or more voice assist devices may be located throughout a smart building. In some embodiments, the voice assist devices may transmit utterance data to a voice assist service. The voice assist service may determine a location in which the voice assist devices are located. In some embodiments, the voice assist devices may be used as an occupancy sensor for a zone or space in which the voice assist devices are located. In some embodiments, the voice assist service may analyze the utterance data for a sentiment corresponding to the temperature of the zone or space. In some embodiments, the voice assist service may control an HVAC system to adjust the temperature of the zone or space based on the analyzed utterance data. In some embodiments, the voice assist service may learn a pattern of when and how to adjust the temperature of the zone or space based on machine learning techniques, such as reinforcement learning (e.g., Q-learning). In various embodiments, the temperature of a zone or space may be controlled based on an occupant's verbal utterances, and may be maintained at a comfortable level for the occupant when the zone or space is occupied or expected to be occupied, while reducing or minimizing energy consumption or costs.

Building Management System and HVAC System

Figure 1:
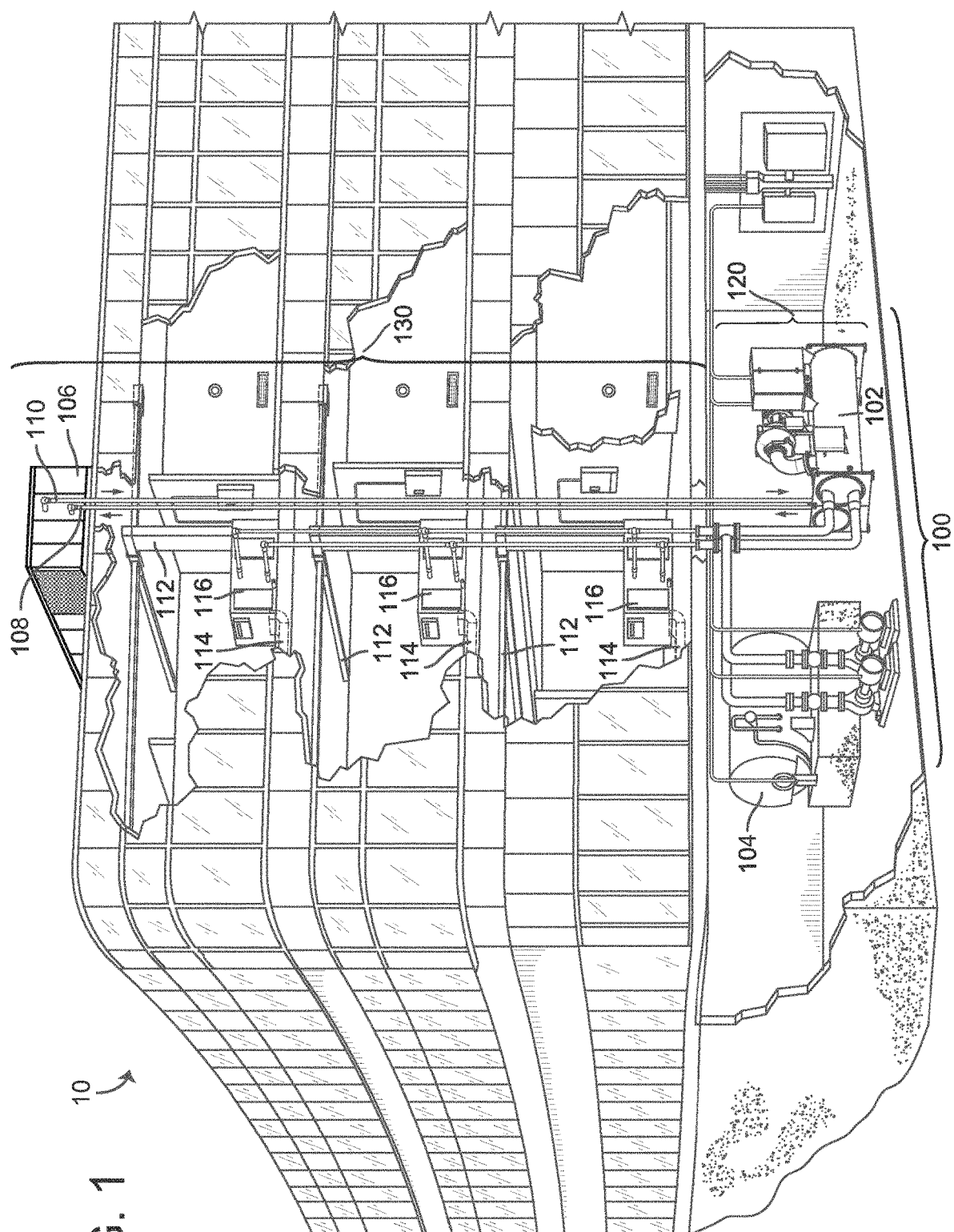
FIG. 1 is a perspective view of a smart building, according to some exemplary embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
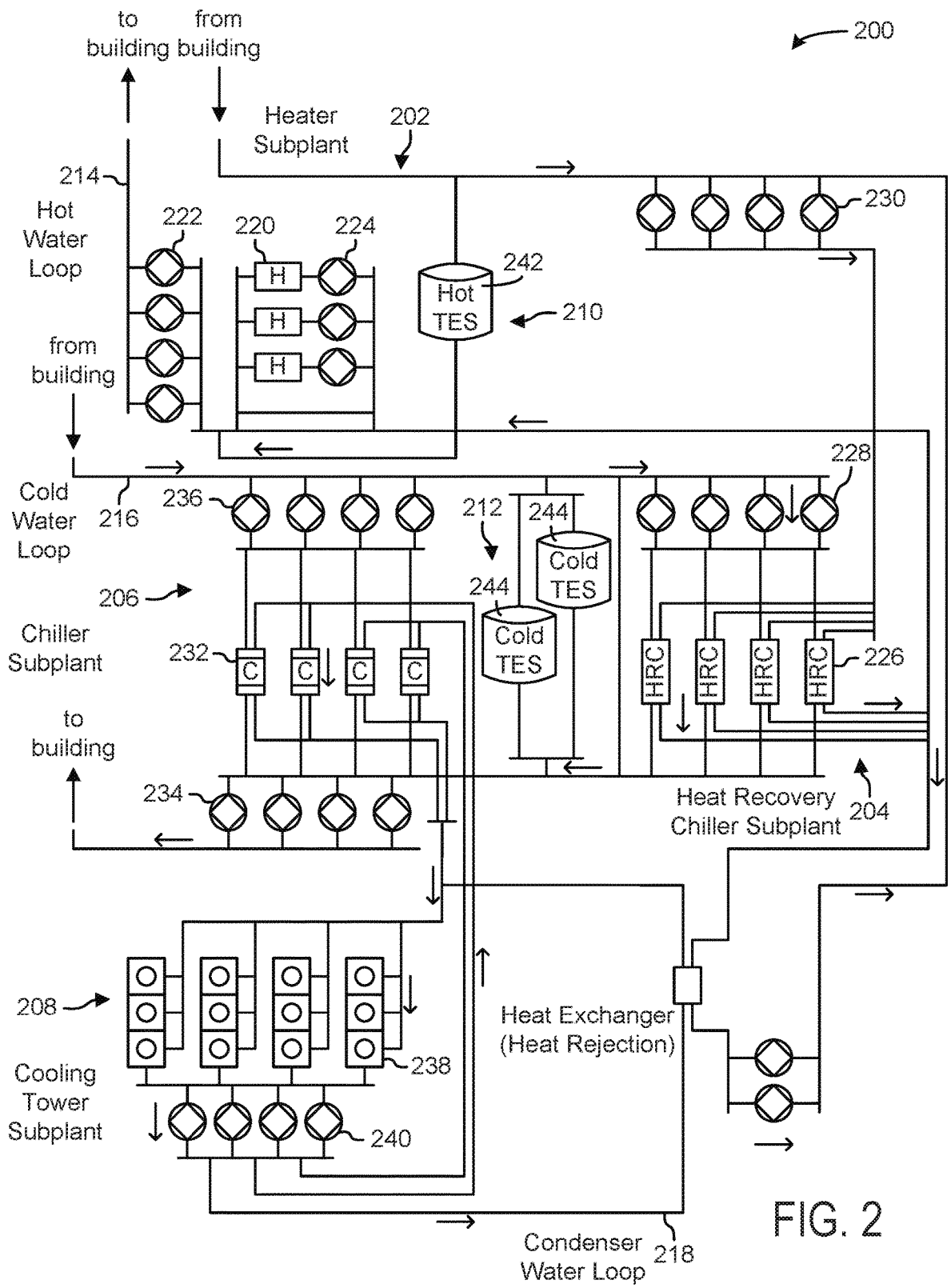
FIG. 2 is a block diagram of a waterside system, according to some exemplary embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
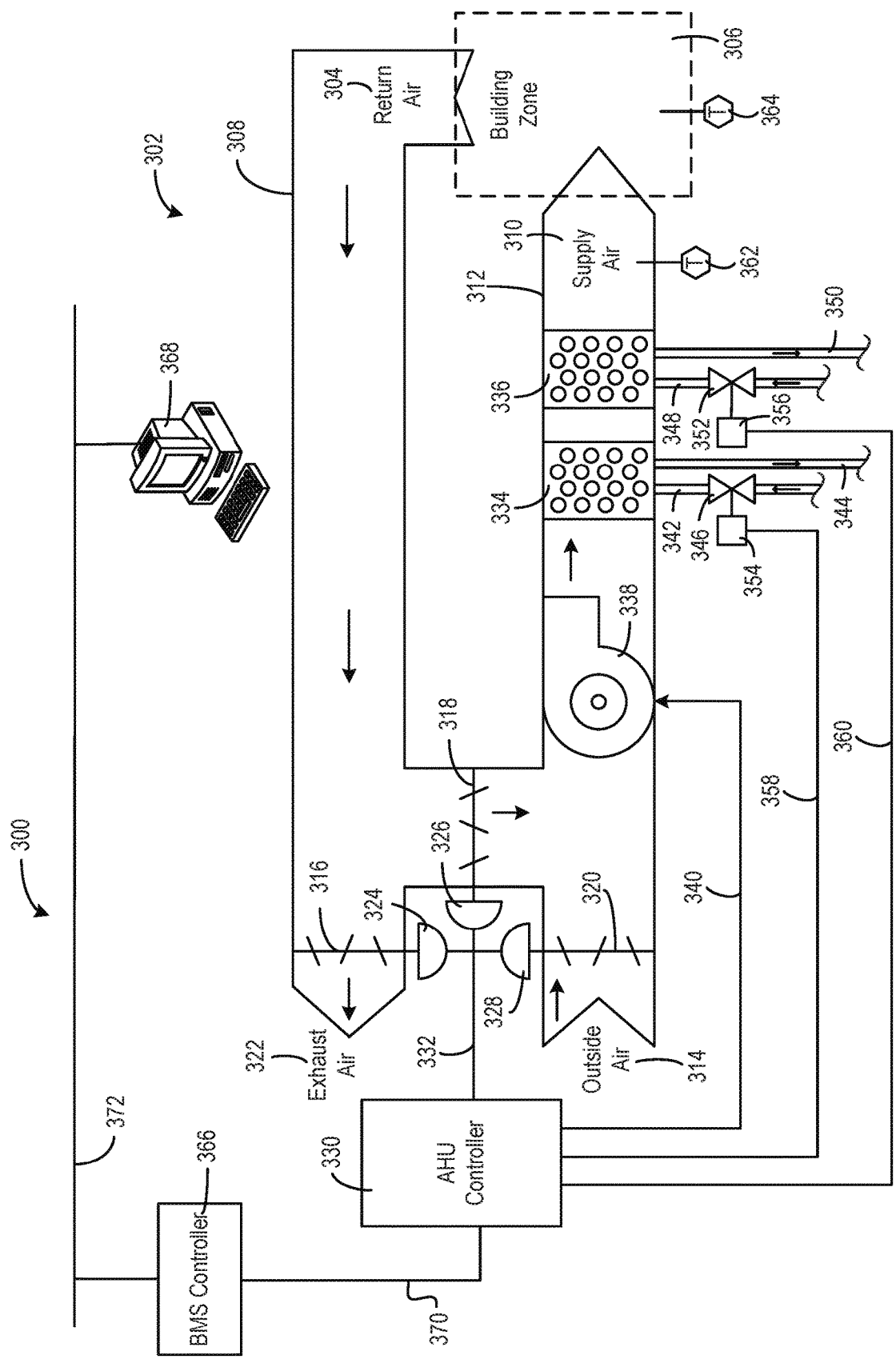
FIG. 3 is a block diagram of an airside system, according to some exemplary embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
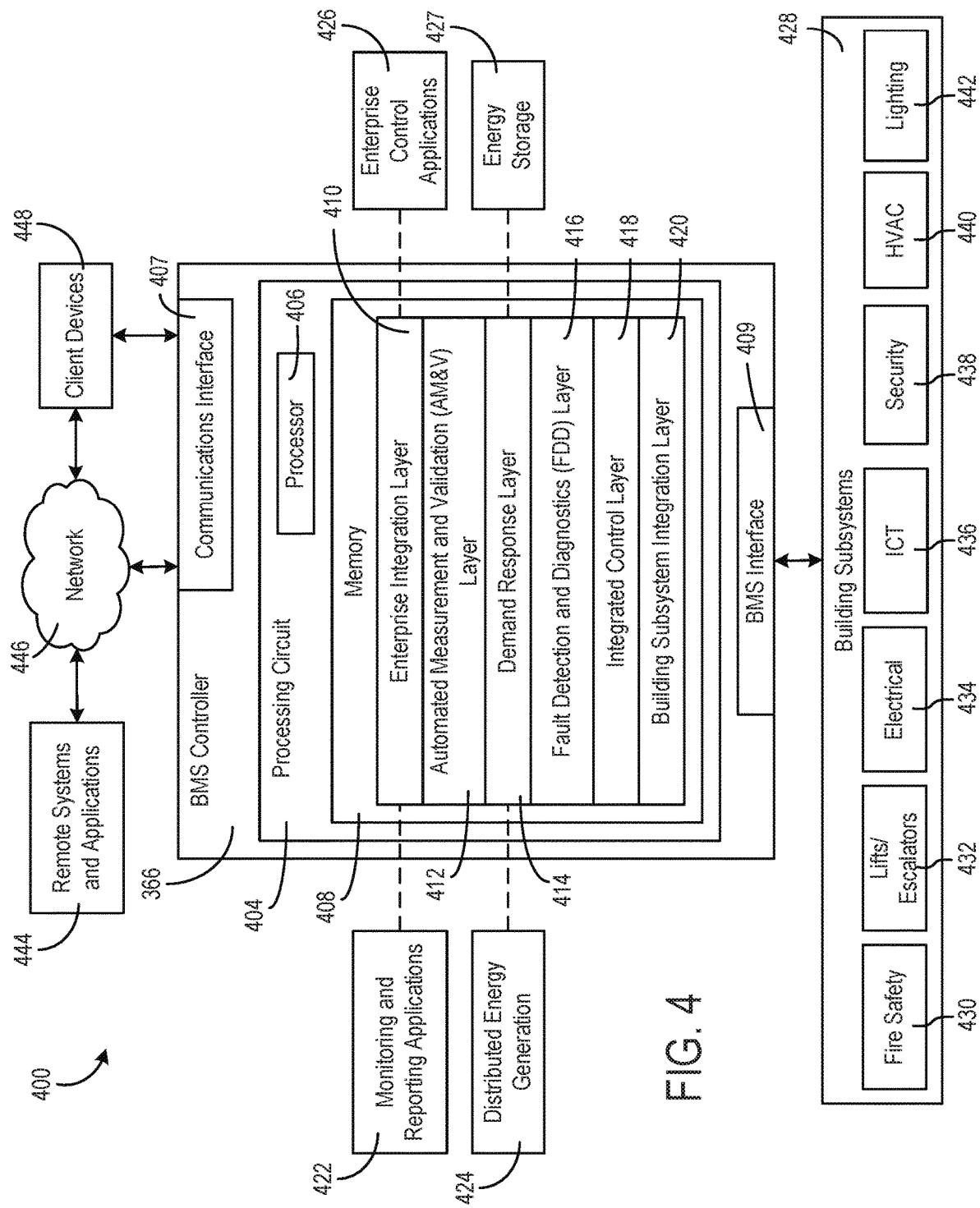
FIG. 4 is a block diagram of a building management system, according to some exemplary embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System with Cloud Building Management Platform

Figure 5:
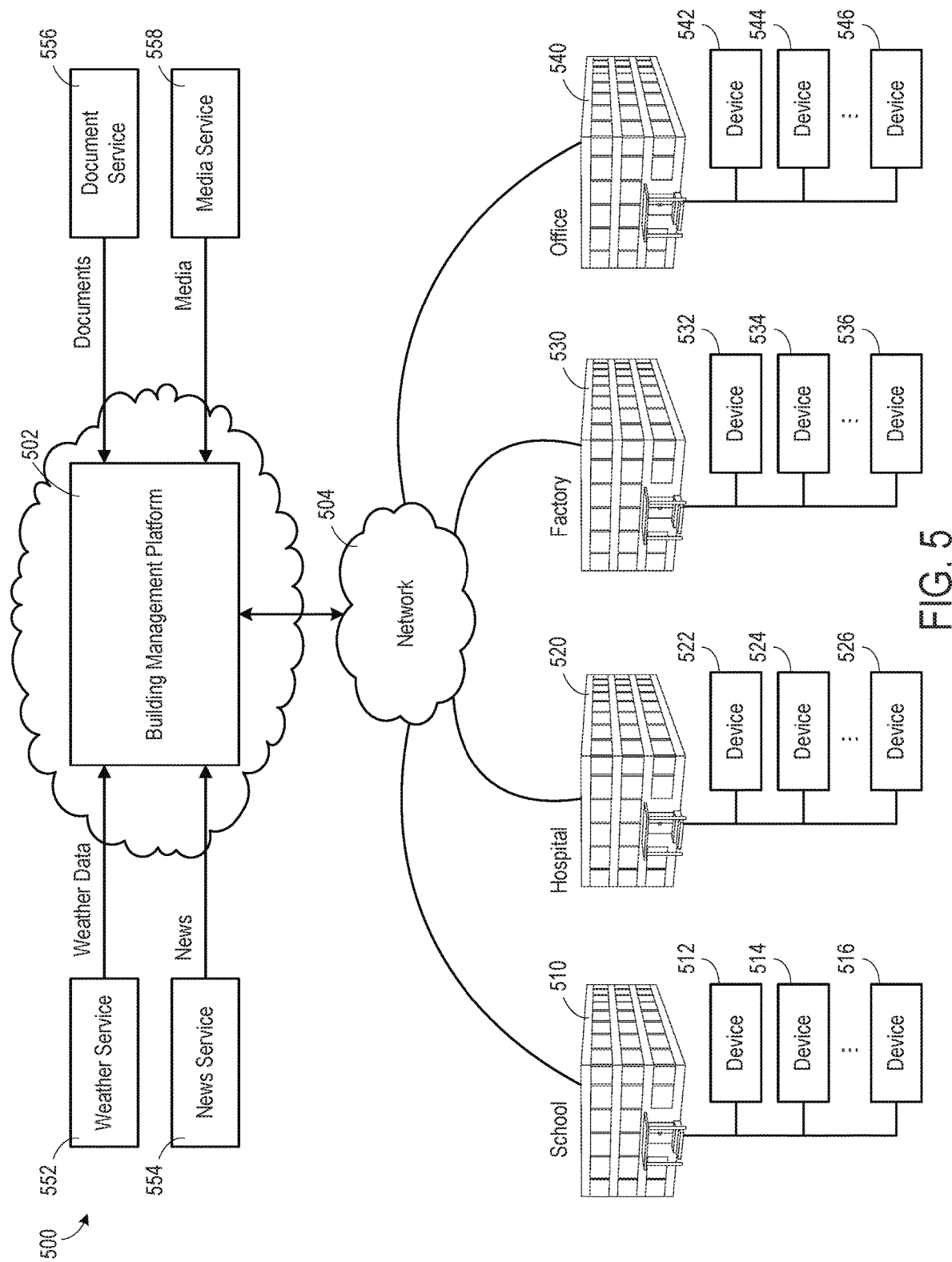
FIG. 5 is a block diagram of a smart building environment, according to some exemplary embodiments.

Referring now to FIG. 5, a block diagram of a smart building environment 500 is shown, according to some exemplary embodiments. Smart building environment 500 is shown to include a building management platform 502. Building management platform 502 can be configured to collect data from a variety of different data sources. For example, building management platform 502 is shown collecting data from buildings 510, 520, 530, and 540. Each of the buildings 510, 520, 530, and 540 may include a BMS and an HVAC system that are the same as or similar to those shown in FIGS. 1-4. The buildings may include a school 510, a hospital 520, a factory 530, an office building 540, and/or the like. However the present disclosure is not limited to the number or types of buildings 510, 520, 530, and 540 shown in FIG. 5. For example, in some embodiments, building management platform 502 may be configured to collect data from one or more buildings, and the one or more buildings may be the same type of building, or may include one or more different types of buildings than that shown in FIG. 5.

Building management platform 502 can be configured to collect data from a variety of devices 512-516, 522-526, 532-536, and 542-546, either directly (e.g., directly via network 504) or indirectly (e.g., via systems or applications in the buildings 510, 520, 530, 540). In some embodiments, devices 512-516, 522-526, 532-536, and 542-546 may include voice assist devices, CO2 sensors, motion sensors, other suitable sensors, and/or internet of things (IoT) devices. Voice assist devices may be stand-alone voice assist devices (e.g., a smart speaker having a receiver) or other computing devices having a voice assist application installed thereon (e.g., a mobile phone, tablet, laptop, desktop, and the like). IoT devices may include any of a variety of physical devices, sensors, actuators, electronics, vehicles, home appliances, and/or other devices having network connectivity which enable IoT devices to communicate with building management platform 502. For example, IoT devices can include voice assist devices, networked sensors, wireless sensors, wearable sensors, environmental sensors, RFID gateways and readers, IoT gateway devices, robots and other robotic devices, GPS devices, smart watches, smart phones, tablets, virtual/augmented reality devices, and/or other networked or networkable devices. However, the present disclosure is not limited thereto, and it should be understood that, in various embodiments, the devices referenced in the present disclosure could be any type of suitable devices capable of communicating data over an electronic network.

In various embodiments, one or more voice assist devices may be arranged at various locations in each of the buildings 510, 520, 530, and 540. For example, the voice assist devices may include the stand-alone voice assist device (e.g., a smart speaker) that can be mounted to or otherwise placed on a wall, ceiling, floor, desk, table, or any suitable location in a zone or space of the building. In some embodiments, the voice assist devices may include a voice assist application that is downloaded or otherwise installed on a mobile or desktop device, such as a smart phone, tablet, laptop, desktop computer, and the like. The voice assist devices can monitor (or listen) for spoken or verbal statements (or commands) relating to the temperature of a corresponding zone or space uttered by one or more occupants in the zone or space. The voice assist devices send the detected uttered statements or commands to the building management platform 502 to be used to control the HVAC subsystem to adjust the temperature based on the utterance.

In some embodiments, the voice assist devices and different sensors send utterance data, measurements, or other data to building management platform 502 using a variety of different communications protocols or data formats. Building management platform 502 can be configured to ingest the utterance data received in any protocol or data format and translate the inbound utterance data into a common data format. Similarly, building management platform 502 can be configured to ingest sensor data received in any protocol or data format and translate the inbound sensor data into a common data format. Building management platform 502 can create a voice assist device object smart entity for each voice assist device and a sensor object smart entity for each sensor that communicates with Building management platform 502. Each voice assist device object smart entity and sensor object smart entity may include one or more static attributes that describe the corresponding voice assist device or sensor, one or more dynamic attributes that indicate the most recent utterance data collected by the voice assist device or values collected by the sensor, and/or one or more relational attributes that relate voice assist device object smart entities and sensor object smart entities to each other and/or to other types of smart entities (e.g., zone or space entities, occupant entities, system entities, data entities, etc.).

In some embodiments, building management platform 502 stores the utterance data and sensor data using data entities. Each data entity may correspond to a particular voice assist device or sensor (e.g., via relational entities) and may include a timeseries of data values received from the corresponding voice assist device or sensor. In some embodiments, building management platform 502 stores relational entities that define relationships between voice assist device object entities, sensor object entities, and the corresponding data entity. For example, each relational entity may identify a particular voice assist device object entity or sensor object entity and a particular data entity, and may define a link between such entities.

Building management platform 502 can collect data from a variety of external systems or services. For example, building management platform 502 is shown receiving weather data from a weather service 552, news data from a news service 554, documents and other document-related data from a document service 556, and media (e.g., video, images, audio, social media, etc.) from a media service 558. In some embodiments, building management platform 502 generates data internally. For example, building management platform 502 may include a web advertising system, a website traffic monitoring system, a web sales system, or other types of platform services that generate data. The data generated by building management platform 502 can be collected, stored, and processed along with the data received from other data sources. Building management platform 502 can collect data directly from external systems or devices or via a network 504 (e.g., a WAN, the Internet, a cellular network, etc.). Building management platform 502 can process and transform collected data to generate timeseries data and entity data. Several features of building management platform 502 are described in more detail below.

Figure 6:
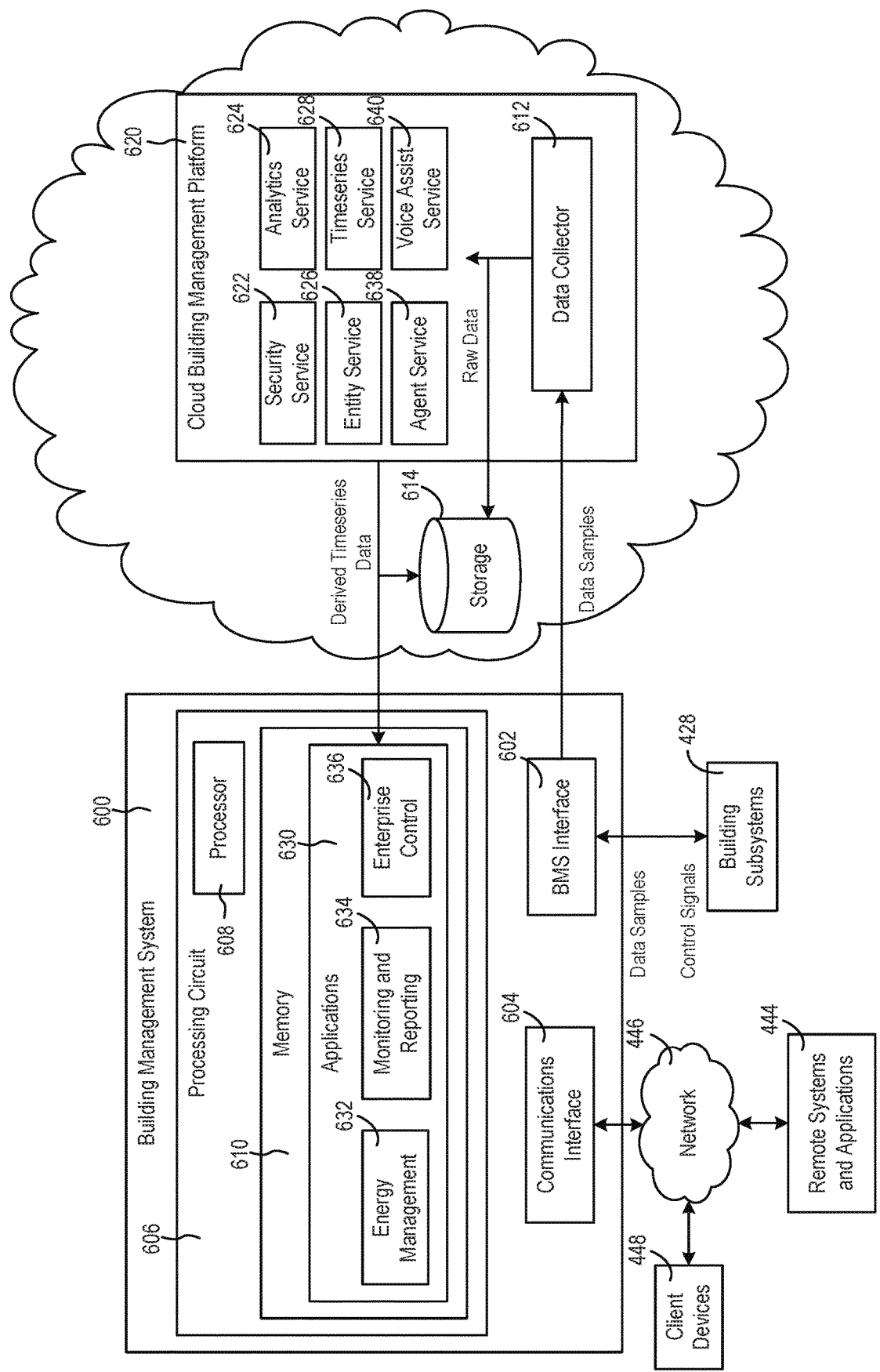
FIG. 6 is a block diagram of another building management system, according to some exemplary embodiments.

Referring now to FIG. 6, a block diagram of another building management system (BMS) 600 is shown, according to some embodiments. BMS 600 can be configured to collect data samples from building subsystems 428 and provide the data samples to Cloud building management platform 620 to generate raw timeseries data, derived timeseries data, and/or entity data from the data samples. In some embodiments, Cloud building management platform 620 may supplement or replace building management platform 502 shown in FIG. 5 or can be implemented separate from building management platform 502. Cloud building management platform 620 can process and transform the raw timeseries data to generate derived timeseries data. Throughout this disclosure, the term "derived timeseries data" is used to describe the result or output of a transformation or other timeseries processing operation performed by various services of the building management platform 620 (e.g., data aggregation, data cleansing, virtual point calculation, etc.). The term "entity data" is used to describe the attributes of various smart entities (e.g., voice assist devices, IoT devices, components, sensors, and the like) and the relationships between the smart entities. The derived timeseries data can be provided to various applications 630 and/or stored in storage 614 (e.g., as materialized views of the raw timeseries data). In some embodiments, Cloud building management platform 620 separates data collection; data storage, retrieval, and analysis; and data visualization into three different layers. This allows Cloud building management platform 620 to support a variety of applications 630 that use the derived timeseries data and allows new applications 630 to reuse the existing infrastructure provided by Cloud building management platform 620.

It should be noted that the components of BMS 600 and/or Cloud building management platform 620 can be integrated within a single device (e.g., a supervisory controller, a BMS controller, etc.) or distributed across multiple separate systems or devices. In other embodiments, some or all of the components of BMS 600 and/or Cloud building management platform 620 can be implemented as part of a cloud-based computing system configured to receive and process data from one or more building management systems. In other embodiments, some or all of the components of BMS 600 and/or Cloud building management platform 620 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

BMS 600 can include many of the same components as BMS 400, as described with reference to FIG. 4. For example, BMS 600 is shown to include a BMS interface 602 and a communications interface 604. Interfaces 602-604 can include wired or wireless communications interfaces (e.g., jacks, antennas, transmitters, receivers, transceivers, wire terminals, etc.) for conducting data communications with building subsystems 428 or other external systems or devices. Communications conducted via interfaces 602-604 can be direct (e.g., local wired or wireless communications) or via a communications network 446 (e.g., a WAN, the Internet, a cellular network, etc.).

Communications interface 604 can facilitate communications between BMS 600 and external applications (e.g., remote systems and applications 444) for allowing user control, monitoring, and adjustment to BMS 600. Communications interface 604 can also facilitate communications between BMS 600 and client devices 448. BMS interface 602 can facilitate communications between BMS 600 and building subsystems 428. BMS 600 can be configured to communicate with building subsystems 428 using any of a variety of building automation systems protocols (e.g., BACnet, Modbus, ADX, etc.). In some embodiments, BMS 600 receives data samples from building subsystems 428 and provides control signals to building subsystems 428 via BMS interface 602.

Building subsystems 428 can include building electrical subsystem 434, information communication technology (ICT) subsystem 436, security subsystem 438, HVAC subsystem 440, lighting subsystem 442, lift/escalators subsystem 432, and/or fire safety subsystem 430, as described with reference to FIG. 4. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3. Each of building subsystems 428 can include any number of devices, controllers, and connections for completing its individual functions and control activities. Building subsystems 428 can include building equipment (e.g., sensors, air handling units, chillers, pumps, valves, etc.) configured to monitor and control a building condition such as temperature, humidity, airflow, etc.

Still referring to FIG. 6, BMS 600 is shown to include a processing circuit 606 including a processor 608 and memory 610. Cloud building management platform may include one or more processing circuits including one or more processors and memory. Each of the processors can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

Memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processors via the processing circuits and can include computer code for executing (e.g., by processor 608) one or more processes described herein.

Still referring to FIG. 6, Cloud building management platform 620 is shown to include a data collector 612. Data collector 612 is shown receiving data samples from building subsystems 428 via BMS interface 602. However, the present disclosure is not limited thereto, and the data collector 612 may receive the data samples directly from the building subsystems 428 (e.g., via network 446 or via any suitable method). In some embodiments, the data samples include data or data values for various data points. The data values can be collected, measured, or calculated values, depending on the type of data point. For example, a data point received from a voice assist device can include a collected data value corresponding to the input statement made by the occupant. A data point received from a temperature sensor can include a measured data value indicating a temperature measured by the temperature sensor. A data point received from a chiller controller can include a calculated data value indicating a calculated efficiency of the chiller. Data collector 612 can receive data samples from multiple different devices (e.g., voice assist devices, IoT devices, sensors, etc.) within building subsystems 428.

The data samples can include one or more attributes that describe or characterize the corresponding data or data points. For example, the data samples can include a name attribute defining a point name or ID (e.g., "B1F4R2.T-Z"), a device attribute indicating a type of device from which the data samples is received (e.g., voice assist device, temperature sensor, motion sensor, occupancy sensor, humidity sensor, chiller, etc.), a unit attribute defining a unit of measure associated with the data value (e.g., ° F., ° C., kPA, etc.), if applicable, and/or any other attribute that describes the corresponding data point or provides contextual information regarding the data point. The types of attributes included in each data point can depend on the communications protocol used to send the data samples to BMS 600 and/or Cloud building management platform 620. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was collected, measured, or calculated. In other embodiments, data collector 612 adds timestamps to the data samples based on the times at which the data samples are received. Data collector 612 can generate raw timeseries data for each of the data points for which data samples are received. Each timeseries can include a series of data values for the same data point and a timestamp for each of the data values. For example, a time series for a data point provided by a voice assist device can include a series of statements made by an occupant and the corresponding times at which the statements were made by the occupant. A timeseries for a data point provided by a temperature sensor can include a series of temperature values measured by the temperature sensor and the corresponding times at which the temperature values were measured. An example of a timeseries which can be generated by data collector 612 is as follows:

[< key, timestamp$_1$, value$_1$ >, < key, timestamp$_2$, value$_2$ >, < key, timestamp$_3$, value$_3$ >]

where key is an identifier of the source of the raw data samples (e.g., timeseries ID, sensor ID, device ID, etc.), timestamp identifies the time at which the ith sample was collected, and value$_i$ indicates the value of the ith sample.

Data collector 612 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured or collected at the time of measurement or collection. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 612 organizes the raw timeseries data. Data collector 612 can identify a system or device associated with each of the data points. For example, data collector 612 can associate a data point with a voice assist device, a temperature sensor, an air handler, a chiller, or any other type of system or device. In some embodiments, a data entity may be created for the data point, in which case, the data collector 612 (e.g., via entity service) can associate the data point with the data entity. In various embodiments, data collector uses the name of the data point, a range of values of the data point, statistical characteristics of the data point, or other attributes of the data point to identify a particular system or device associated with the data point. Data collector 612 can then determine how that system or device relates to the other systems or devices in the building site from entity data. For example, data collector 612 can determine that the identified system or device is part of a larger system (e.g., a HVAC system) or serves a particular space (e.g., a particular building, a room or zone of the building, etc.) from the entity data. In some embodiments, data collector 512 uses or retrieves an entity graph (e.g., via entity service 626) when organizing the timeseries data.

Data collector 612 can provide the raw timeseries data to the services of Cloud building management platform 620 and/or store the raw timeseries data in storage 614. Storage 614 may be internal storage or external storage. For example, storage 614 can be internal storage with relation to Cloud building management platform 620 and/or BMS 600, and/or may include a remote database, cloud-based data hosting, or other remote data storage. Storage 614 can be configured to store the raw timeseries data obtained by data collector 612, the derived timeseries data generated by Cloud building management platform 620, and/or directed acyclic graphs (DAGs) used by Cloud building management platform 620 to process the timeseries data.

Still referring to FIG. 6, Cloud building management platform 620 can receive the raw timeseries data from data collector 612 and/or retrieve the raw timeseries data from storage 614. Cloud building management platform 620 can include a variety of services configured to analyze, process, and transform the raw timeseries data. For example, Cloud building management platform 620 is shown to include a security service 622, an analytics service 624, an entity service 626, a timeseries service 628, an agent service 636, and a voice assist service 640. Security service 622 can assign security attributes to the raw timeseries data to ensure that the timeseries data are only accessible to authorized individuals, systems, or applications. Security service 622 may include a messaging layer to exchange secure messages with the entity service 626. In some embodiment, security service 622 may provide permission data to entity service 626 so that entity service 626 can determine the types of entity data that can be accessed by a particular entity or device. Entity service 624 can assign entity information (or entity data) to the timeseries data to associate data points with a particular system, device, or space. Timeseries service 628 and analytics service 624 can apply various transformations, operations, or other functions to the raw timeseries data to generate derived timeseries data.

Agent service 638 can generate and maintain agents for various devices, including voice assist devices, IoT devices, sensors, building subsystems, equipment, and other devices, and may facilitate communications among the various devices. For example, in some embodiments, agent service 638 can generate a communication channel for each zone or space, and an agent configured for each device in the zone or space may be configured to publish messages to the communication channel and/or subscribe to the communication channel to allow the agent to receive messages published to the communication channel. In some embodiments, utterance data received from the voice assist devices may be stored as timeseries data or derived timeseries data, where the data points of the utterance data includes the detected statements (e.g., as string values) uttered by the occupant. Voice assist service 640 can process the time series utterance data to determine whether the temperature of a corresponding zone or space should be increased, decreased, unchanged, or set to a certain set-point. For example, voice assist service 640 can generate derived timeseries data based on the data points collected by the voice assist devices that can be used to control the HVAC subsystem to adjust the temperature accordingly.

In some embodiments, timeseries service 628 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 628 provide an efficient mechanism for applications 630 to query the timeseries data. For example, applications 630 can construct visualizations of the timeseries data (e.g., charts, graphs, etc.) using the pre-aggregated data rollups instead of the raw timeseries data. This allows applications 630 to simply retrieve and present the pre-aggregated data rollups without requiring applications 630 to perform an aggregation in response to the query. Since the data rollups are pre-aggregated, applications 630 can present the data rollups quickly and efficiently without requiring additional processing at query time to generate aggregated timeseries values.

In some embodiments, timeseries service 628 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 628 can calculate a virtual data point ($pointID_3$) by adding two or more actual data points ($pointID_1$ and $pointID_2$) (e.g., $pointID_3=pointID_1+pointID_2$). As another example, timeseries service 628 can calculate an enthalpy data point ($pointID_4$) based on a measured temperature data point ($pointID_5$) and a measured pressure data point ($pointID_6$) (e.g., $pointID_4=enthalpy(pointID_5, pointID_6)$). The virtual data points can be stored as derived timeseries data.

Applications 630 can access and use the virtual data points in the same manner as the actual data points. Applications 630 may not need to know whether a data point is an actual data point or a virtual data point since both types of data points can be stored as derived timeseries data and can be handled in the same manner by applications 630. In some embodiments, the derived timeseries are stored with attributes designating each data point as either a virtual data point or an actual data point. Such attributes allow applications 630 to identify whether a given timeseries represents a virtual data point or an actual data point, even though both types of data points can be handled in the same manner by applications 630. These and other features of timeseries service 628 are described in greater detail with reference to FIG. 9.

In some embodiments, analytics service 624 analyzes the raw timeseries data and/or the derived timeseries data to detect faults. Analytics service 624 can apply a set of fault detection rules to the timeseries data to determine whether a fault is detected at each interval of the timeseries. Fault detections can be stored as derived timeseries data. For example, analytics service 624 can generate a new fault detection timeseries with data values that indicate whether a fault was detected at each interval of the timeseries. The fault detection timeseries can be stored as derived timeseries data along with the raw timeseries data in storage 614.

Still referring to FIG. 6, BMS 600 is shown to include several applications 630 including an energy management application 632, monitoring and reporting applications 634, and enterprise control applications 636. Although only a few applications 630 are shown, it is contemplated that applications 630 can include any of a variety of suitable applications configured to use the raw or derived timeseries generated by Cloud building management platform 620. In some embodiments, applications 630 exist as a separate layer of BMS 600 (e.g., a part of Cloud building management platform 620 and/or data collector 612). In other embodiments, applications 630 can exist as remote applications that run on remote systems or devices (e.g., remote systems and applications 444, client devices 448, and/or the like).

Applications 630 can use the derived timeseries data to perform a variety data visualization, monitoring, and/or control activities. For example, energy management application 632 and monitoring and reporting application 634 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 636 can use the derived timeseries data to perform various control activities. For example, enterprise control application 636 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 428. In some embodiments, building subsystems 428 use the control signals to operate building equipment. For example, enterprise control application 636 can use the derived timeseries data generated by voice assist service 640 to provide control signals to the HVAC system 440 to control the temperature of a corresponding zone or space. Operating the building equipment can affect the measured or calculated values of the data samples provided to BMS 600 and/or Cloud building management platform 620. Accordingly, enterprise control application 636 can use the derived timeseries data as feedback to control the systems and devices of building subsystems 428.

Cloud Building Management Platform Entity Service

Figure 7:
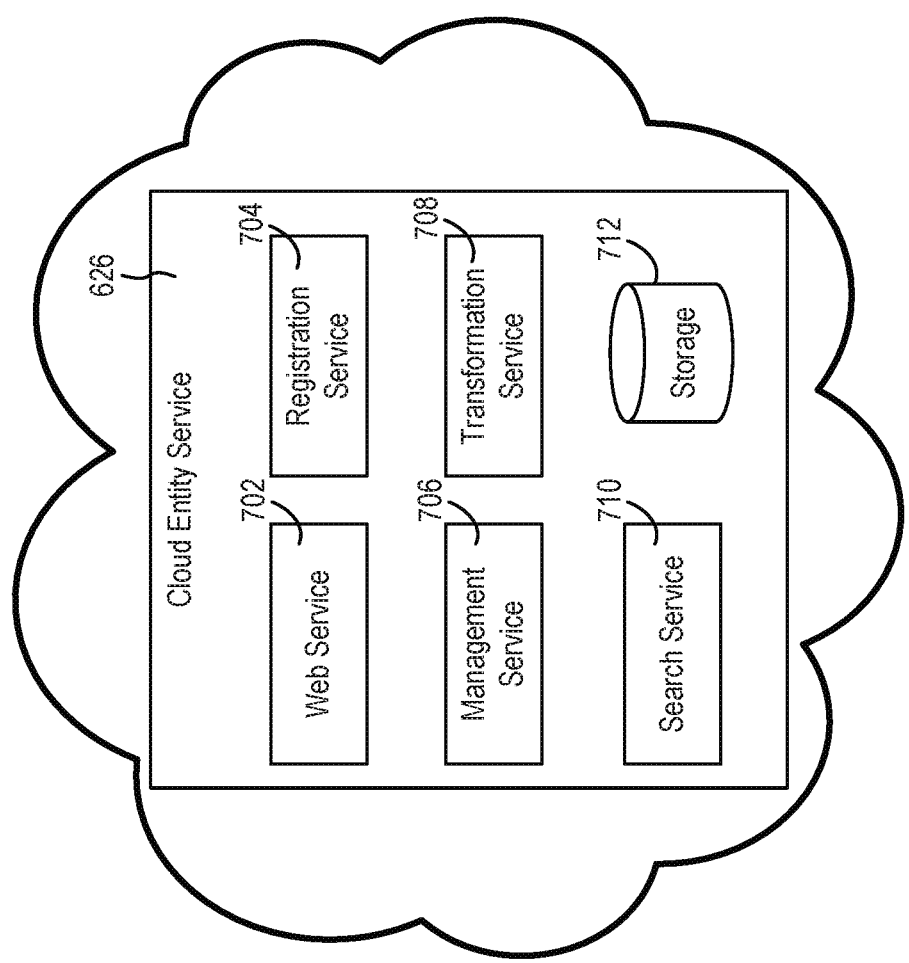
FIG. 7 is a block diagram illustrating an entity service of FIG. 6 in greater detail, according to some exemplary embodiments.

Referring now to FIG. 7, a block diagram illustrating entity service 626 in greater detail is shown, according to some embodiments. Entity service 626 registers and manages various buildings (e.g., 510-540), spaces, persons, subsystems (e.g., 428), devices (e.g., 512-546), and other entities in the Cloud building management platform 620. According to various embodiments, an entity may be any person, place, or physical object, hereafter referred to as an object entity. Further, an entity may be any event, data point, or record structure, hereinafter referred to as data entity. In addition, an entity may define a relationship between entities, hereinafter referred to as a relational entity.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point (e.g., timeseries data) is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 626 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is derived, analyzed, inferred, calculated, or determined based on data from a plurality of data sources.

In some embodiments, the relational entity may be defined as having at least a static attribute. The static attribute of the relational entity may semantically define the type of relationship between two or more entities. For example, in a non-limiting embodiment, a relational entity for a relationship that semantically defines that Entity A has a part of Entity B, or that Entity B is a part of Entity A may include:

hasPart{Entity A, Entity B} where the static attribute hasPart defines what the relationship is of the listed entities, and the order of the listed entities or data field of the relational entity specifies which entity is the part of the other (e.g., Entity A→hasPart→Entity B).

In various embodiments, the relational entity is an object-oriented construct with predefined fields that define the relationship between two or more entities, regardless of the type of entities. For example, Cloud building management platform 620 can provide a rich set of pre-built entity models with standardized relational entities that can be used to describe how any two or more entities are semantically related, as well as how data is exchanged and/or processed between the entities. Accordingly, a global change to a definition or relationship of a relational entity at the system level can be effected at the object level, without having to manually change the entity relationships for each object or entity individually. Further, in some embodiments, a global change at the system level can be propagated through to third-party applications integrated with Cloud building management platform 620 such that the global change can be implemented across all of the third-party applications without requiring manual implementation of the change in each disparate application.

Figure 8:
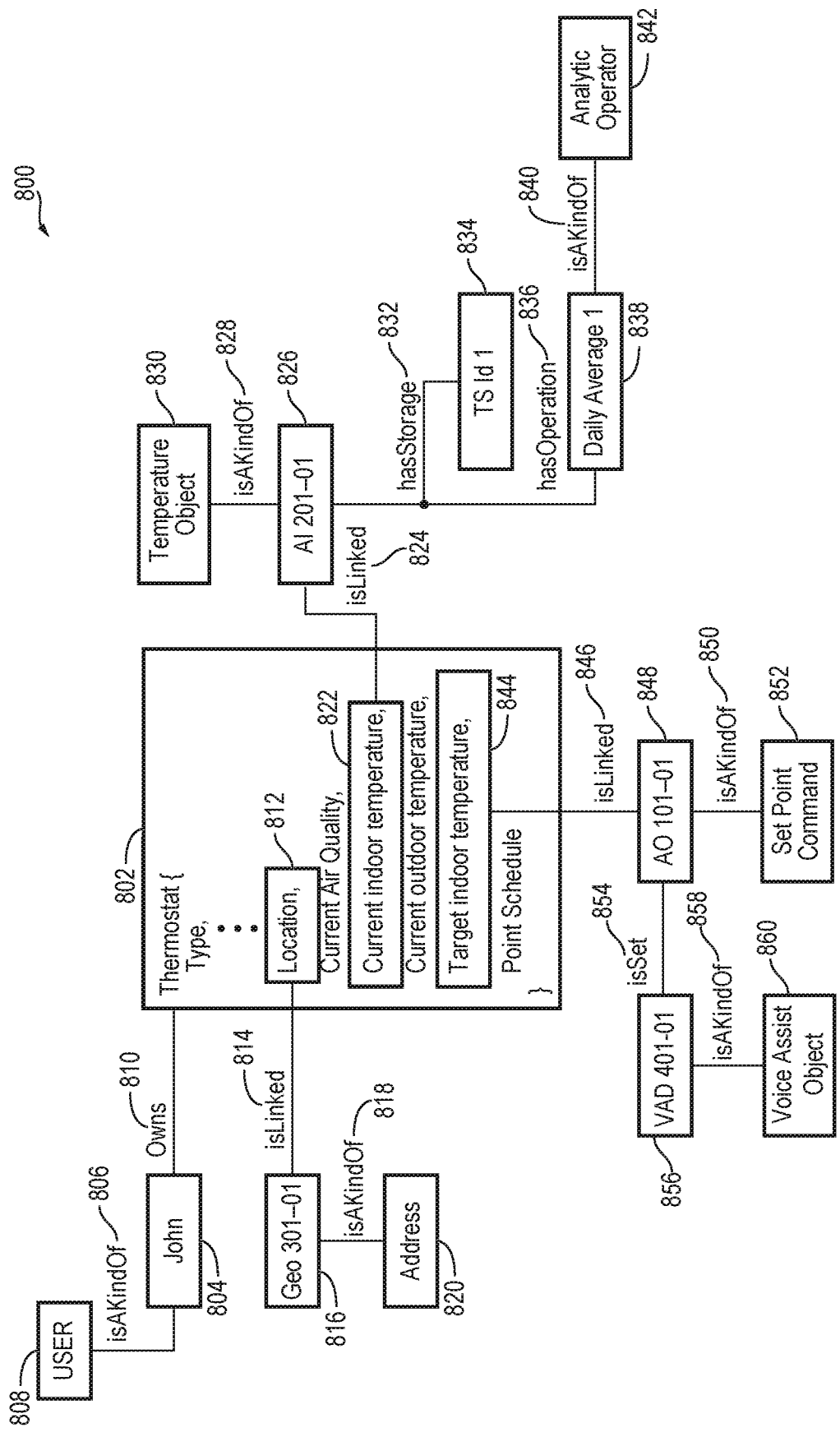
FIG. 8 in an example entity graph of entity data, according to some exemplary embodiments.

For example, referring to FIG. 8, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational entities that semantically define the relationships between the entities. The relational entities may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

```
Thermostat{
    Type,
    Model No,
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}
``` where various attributes are static attributes (e.g., "Type," "Model Number," "Device Name," etc.,), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.,), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device Type") and dynamic attributes (e.g., "Present-Value").

While structuring the entities via entity type or object may help to define the data representation of the entities, these data models do not provide information on how the entities relate to each other. For example, a BMS, building subsystem, or device may need data from a plurality of sources as well as information on how the sources relate to each other in order to provide a proper decision, action, or recommendation. Accordingly, in various embodiments, the entity data further includes the relational entities to semantically define the relationships between the entities, which may help to increase speeds in analyzing data, as well as provide ease of navigation and browsing.

For example, still referring to FIG. 8, an entity graph 800 for the Thermostat object entity 802 includes various class entities (e.g., User, Address, SetPoint Command, and Temperature Object), relational entities (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational entities describe the relationships between the various class, object, and data entities in a semantic and syntactic manner, so that an application or user viewing the entity graph 800 can quickly determine the relationships and data process flow of the Thermostat object entity 802, without having to resort to a data base analyst or engineer to create, index, and/or manage the entities (e.g., using SQL or NoSQL).

For example, the entity graph 800 shows that a person named John (object entity) 804 isAKindOf (relational entity) 806 User (class entity) 808. John 804 Owns (relational entity) 810 the Thermostat 802. The Thermostat 802 has a location attribute (dynamic attribute) 812 that isLinked (relational entity) 814 to Geo 301-01 (data entity) 816, which isAKindOf (relational entity) 818 an Address (class entity) 820. Accordingly, Geo 301-01 316 should have a data point corresponding to an address.

The Thermostat 802 further includes a "Current indoor temperature" attribute (dynamic attribute) 822 that isLinked (relational entity) 824 to AI 201-01 (data entity) 826. AI 201-01 826 isAKindOf (relational entity) 828 Temperature Object (class entity) 830. Thus, AI 201-01 826 should contain some sort of temperature related data. AI 201-01 826 hasStorage (relational entity) 832 at TS ID 1 (data entity) 834, which may be raw or derived timeseries data for the temperature readings. AI 201-01 826 hasOperation (relational entity) 836 of Daily Average 1 (data entity) 838, which isAKindOf (relational entity) 840 Analytic Operator (class entity) 842. Thus, Daily Average 1 results from an analytic operation that calculates the daily average of the indoor temperature. AI 201-01 826 further hasOperation (relational entity) 854 of Abnormal Indoor Temperature (data entity) 856, which isAKindOf (relational entity) 858 Analytic Operator (class entity) 860. Accordingly, Abnormal Indoor Temperature results from an analytic operation to determine an abnormal temperature (e.g., exceeds or falls below a threshold value).

In this example, the data entity AI 201-01 526 may be represented by the following data model:

```
point {
    name: "AI 201-01";
    type: "analog input";
    value: 72;
    unit: "Degree-F";
    source: "Temperature Sensor 1"
}
``` where "point" is an example of a data entity that may be created by Cloud building management platform 620 to hold the value for the linked "Current indoor temperature" 822 dynamic attribute of the Thermostat entity 802, and source is the sensor or device in the Thermostat device that provides the data to the linked "Current indoor temperature" 822 dynamic attribute.

The data entity TS Id 1 534 may be represented, for example, by the following data model:

```
timeseries {
    name: "TS Id 1";
    type: "Daily Average";
    values: "[68, 20666, 70, 69, 71];
    unit: "Degree-F";
    point: "AI 201-01";
    source: "Daily Average 1"
}
``` where the data entity Daily Average 1 838 represents a specific analytic operator used to create the data entity for the average daily timeseries TS Id 1 834 based on the values of the corresponding data entity for point AI 201-01 826. The relational entity hasOperation shows that the AI 201-01 data entity 826 is used as an input to the specific logic/math operation represented by Daily Average 1 838. TS Id 1 834 might also include an attribute that identifies the analytic operator Daily Average 1 838 as the source of the data samples in the timeseries.

Still referring to FIG. 8, the entity graph 800 for Thermostat 802 shows that the "Target indoor temperature" attribute (dynamic attribute) 844 isLinked (relational attribute) 846 to the data entity AO 101-01 (data entity) 848. AO 101-01 data entity 848 isAKindOf (relational attribute) 850 SetPoint Command (class entity) 852. Thus, the data in data entity AO 101-01 848 may be set via a command by the user or other entity (e.g., a voice assist device), and may be used to control the Thermostat object entity 802. For example, AO 101-01 data entity 848 isSet (relational attribute) 854 by VAD 401-01 (object entity) corresponding to a voice assist device, which isAKindOf (relational attribute) 858 Voice Assist Object (class entity) 860. Accordingly, in various embodiments, entity graph 800 provides a user friendly view of the various relationships between the entities and data processing flow, which provides for ease of navigation, browsing, and analysis of data.

Referring again to FIG. 7, entity service 626 may transforms raw data samples and/or raw timeseries data into data corresponding to entity data. For example, as discussed above with reference to FIG. 8, entity service 626 can create data entities that use and/or represent data points in the timeseries data. Entity service 626 includes a web service 702, a registration service 704, a management service 706, a transformation service 708, a search service 710, and storage 712. In some embodiments, storage 712 may be internal storage or external storage. For example, storage 712 may be storage 614 (see FIG. 6), internal storage with relation to entity service 626, and/or may include a remote database, cloud-based data hosting, or other remote data storage.

Web service 702 can be configured to interact with web-based applications to send entity data and/or receive raw data (e.g., data samples, timeseries data, and the like). For example, web service 702 can provide an interface (e.g., API, UI/UX, and the like) to manage (e.g., register, create, edit, delete, and/or update) an entity (e.g., class entity, object entity, data entity, relational entity, and/or the like). In some embodiments, web service 702 provides entity data to web-based applications. For example, if one or more of applications 630 are web-based applications, web service 702 can provide entity data to the web-based applications. In some embodiments, web service 702 receives raw data samples and/or raw timeseries data including device information from a web-based data collector, or a web-based security service to identify authorized entities and to exchange secured messages. For example, if data collector 612 is a web-based application, web service 702 can receive the raw data samples and/or timeseries data including a device attribute indicating a type of device (e.g., voice assist device, sensor, IoT device, and the like) from which the data samples and/or timeseries data are received from data collector 612. In some embodiments, web service 702 may message security service 622 to request authorization information and/or permission information of a particular user, building, BMS, building subsystem, device, application, or other entity. In some embodiments, web service 702 receives derived timeseries data from timeseries service 628, and/or may provide entity data to timeseries service 628. In some embodiments, the entity service 626 processes and transforms the collected data to generate the entity data.

The registration service 704 can perform registration of devices and entities. For example, registration service 704 can communicate with building subsystems 428 and client devices 448 (e.g., via web service 702) to register each entity (e.g., building, BMS, building subsystems, devices, and the like) with Cloud building management platform 620. In some embodiments, registration service 704 registers a particular building subsystem 428 (or the devices therein) with a specific user and/or a specific set of permissions and/or entitlements. For example, a user may register a device key and/or a device ID associated with the device via a web portal (e.g., web service 702). In some embodiments, the device ID and the device key may be unique to the device. The device ID may be a unique number associated with the device such as a unique alphanumeric string, a serial number of the device, and/or any other static identifier. In various embodiments, the device is provisioned by a manufacturer and/or any other entity. In various embodiments, the device key and/or device ID are saved to the device or building subsystem 428 based on whether the device includes a trusted platform module (TPM). If the device includes a TPM, the device or building subsystem 428 may store the device key and/or device ID according to the protocols of the TPM. If the device does not include a TPM, the device or building subsystem 428 may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 704 (e.g., an IoT hub such as AZURE® IoT Hub). In some embodiments, registration service 704 is configured to store the device key and the device ID in secure permanent storage and/or may be stored by security service 622 (e.g., by a security API). In some embodiments, a manufacturer and/or any other individual may register the device key and the device ID with registration service 704 (e.g., via web service 702). In various embodiments, the device key and the device ID are linked to a particular profile associated with the building subsystem 428 or device and/or a particular user profile (e.g., a particular user). In this regard, a device (or building subsystem 428) can be associated with a particular user. In various embodiments, the device key and the device ID make up the profile for device. The profile may be registered as a device that has been manufactured and/or provisioned but has not yet been purchased by an end user.

In various embodiments, registration service 704 adds and/or updates a device in an building hub device registry. In various embodiments, registration service 704 may determine if the device is already registered, can set various authentication values (e.g., device ID, device key), and can update the building hub device registry. In a similar manner, registration service 704 can update a document database with the various device registration information.

In some embodiments, registration service 704 can be configured to create a virtual representation (e.g., "digital twins" or "shadow records") of each object entity (e.g., person, room, building subsystem, device, and the like) in the building within Cloud building management platform 620. In some embodiments, the virtual representations are smart entities that include attributes defining or characterizing the corresponding object and are associated to the corresponding object entity via relational entities defining the relationship of the object and the smart entity representation thereof. In some embodiments, the virtual representations maintain shadow copies of the object entities with versioning information so that entity service 626 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational entity (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

Management service 706 may create, modify, or update various attributes, data entities, and/or relational entities of the objects managed by entity service 626 for each entity rather than per class or type of entity. This allows for separate processing/analytics for each individual entity rather than only to a class or type of entity. Some attributes (or data entities) may correspond to, for example, the most recent value of a data point provided to BMS 600 or Cloud building management platform 620 via the raw data samples and/or timeseries data. For example, the "Current indoor temperature" dynamic attribute of the "Thermostat" object entity 802 in the example discussed above may be the most recent value of indoor temperature provided by the Thermostat device. Management service 706 can use the relational entities of the entity data for Thermostat to determine where to update the data of the attribute.

For example, Management service 706 may determine that a data entity (e.g., AI 201-01) is linked to the "Current indoor temperature" dynamic attribute of Thermostat via an isLinked relational entity. In this case, Management service 706 may automatically update the attribute data in the linked data entity. Further, if a linked data entity does not exist, Management service 706 can create a data entity (e.g., AI 201-01) and an instance of the isLinked relational entity 824 to store and link the "Current indoor temperature" dynamic attribute of Thermostat therein. Accordingly, processing/analytics for Thermostat 802 may be automated. As another example, a "most recent view" attribute (or linked data entity) of a webpage object entity may indicate the most recent time at which the webpage was viewed. Management service 706 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, Management service 706 can use the relational entities in entity data to identify a related access control device (e.g., a card reader, a keypad, etc.) at the entrance/exit of a building object entity. Management service 706 can use raw data received from the identified access control device to track the number of occupants entering and exiting the building object entity (e.g., via related card entities used by the occupants to enter and exit the building). Management service 706 can update a "number of occupants" attribute (or corresponding data entity) of the building object each time a person enters or exits the building using a related card entity, such that the "number of occupants" attribute (or data entity) reflects the current number of occupants within the building object. As another example, a "total revenue" attribute associated with a product line object may be the summation of all the revenue generated from related point of sales entities. Management service 706 can use the raw data received from the related point of sales entities to determine when a sale of the product occurs, and can identify the amount of revenue generated by the sales. Management service 706 can then update the "total revenue" attribute (or related data entity) of the product line object by adding the most recent sales revenue from each of the related point of sales entities to the previous value of the attribute.

In some embodiments, management service 706 may use derived timeseries data generated from timeseries service 628 to update or create a data entity (e.g., Daily Average 1) that uses or stores the data points in the derived timeseries data. For example, the derived timeseries data may include a virtual data point corresponding to the daily average steps calculated by timeseries service 628, and management service 706 may update the data entity or entities that store or use the data corresponding to the virtual data point as determined via the relational entities. In some embodiments, if a data entity corresponding to the virtual data point does not exist, management service 706 may automatically create a corresponding data entity and one or more relational entities that describe the relationship between the corresponding data entity and other entities.

In some embodiments, management service 706 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 706 can use relational entities of the person object entity to identify a related card device and/or a related card reader from a related building object entity (e.g., the building in which the person works) to determine the physical location of the person at any given time. Management service 706 can determine from raw data (e.g., time that the card device was scanned by the card reader) or derived timeseries data (e.g., average time of arrival) whether the person object is located in the building or may be in transit to the building. Management service 706 can use weather data from a weather service in the region in which the building object entity is located to determine whether any severe weather is approaching the person's location. Similarly, management service 706 can use building data from related building entities of the building object entity to determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 706 can use these and other types of data as inputs to a risk function that calculates the value of the person object's "risk" attribute and can update the person object (or related device entity of the person object) accordingly.

In another example, an object entity representing a voice assist device may be linked (via relational entities) to various known users of the voice assist device. Management service 706 can use the relational entities to identify a particular user from among the various known users and can identify a historical data entity for the particular user from a data entity linked to the particular user. Management service 706 can provide the historical data to voice assist service 640 to predict a comfortable temperature setting or set-point for the particular user. In another example, historical data from various users can be used to predict temperature settings or set-points in different zones or spaces of the building at different times of day. For example, an average temperature derived timeseries data for a particular time of day as determined by the timestamp for a particular user or all known users may be used to predict a comfortable temperature setting or set-point in any zone or space, even when no statements or commands have been collected by the voice assist device. Further, the average temperature derived timeseries for one building may be used to predict a comfortable temperature setting or set-point in a zone or space of another similar or related building.

In some embodiments, management service 706 can be configured to synchronize configuration settings, parameters, and other device-specific or object-specific information between the entities and Cloud building management platform 620. In some embodiments, the synchronization occurs asynchronously. Management service 706 can be configured to manage device properties dynamically. The device properties, configuration settings, parameters, and other device-specific information can be synchronized between the smart entities created by and stored within Cloud building management platform 620.

In some embodiments, management service 706 is configured to manage a manifest for each of the building subsystems 528 (or devices therein). The manifest may include a set of relationships between the building subsystems 528 and various entities. Further, the manifest may indicate a set of entitlements for the building subsystems 528 and/or entitlements of the various entities and/or other entities. The set of entitlements may allow a BMS 600, building subsystem 528 and/or a user to perform certain actions within the building or (e.g., control, configure, monitor, and/or the like).

Still referring to FIG. 7, transformation service 708 can provide data virtualization, and can transform various predefined standard data models for entities in a same class or type to have the same entity data structure, regardless of the object, device, or Thing that the entity represents. For example, each object entity under an object class may include a location attribute, regardless of whether or not the location attribute is used or even generated. Thus, if an application is later developed requiring that each object entity includes a location attribute, manual mapping of heterogenous data of different entities in the same class may be avoided. Accordingly, interoperability and scalability of applications may be improved.

In some embodiments, transformation service 708 can provide entity matching, cleansing, and correlation so that a unified cleansed view of the entity data including the entity related information (e.g., relational entities) can be provided. Transformation service 708 can support semantic and syntactic relationship description in the form of standardized relational entities between the various entities. This may simplify machine learning because the relational entities themselves provide all the relationship description between the other entities. Accordingly, the rich set of pre-built entity models and standardized relational entities may provide for rapid application development and data analytics.

Still referring to FIG. 7, the search service 710 provides a unified view of product related information in the form of the entity graph, which correlates entity relationships (via relational entities) among multiple data sources (e.g., CRM, ERP, MRP and the like). In some embodiments, the search service 710 is based on a schema-less and graph based indexing architecture. The search service 710 facilitates simple queries without having to search multiple levels of the hierarchical tree of the entity graph. For example, search service 710 can return results based on searching of entity type, individual entities, attributes, or even relational entities without requiring other levels or entities of the hierarchy to be searched.

Cloud Building Management Platform Timeseries Service

Figure 9:
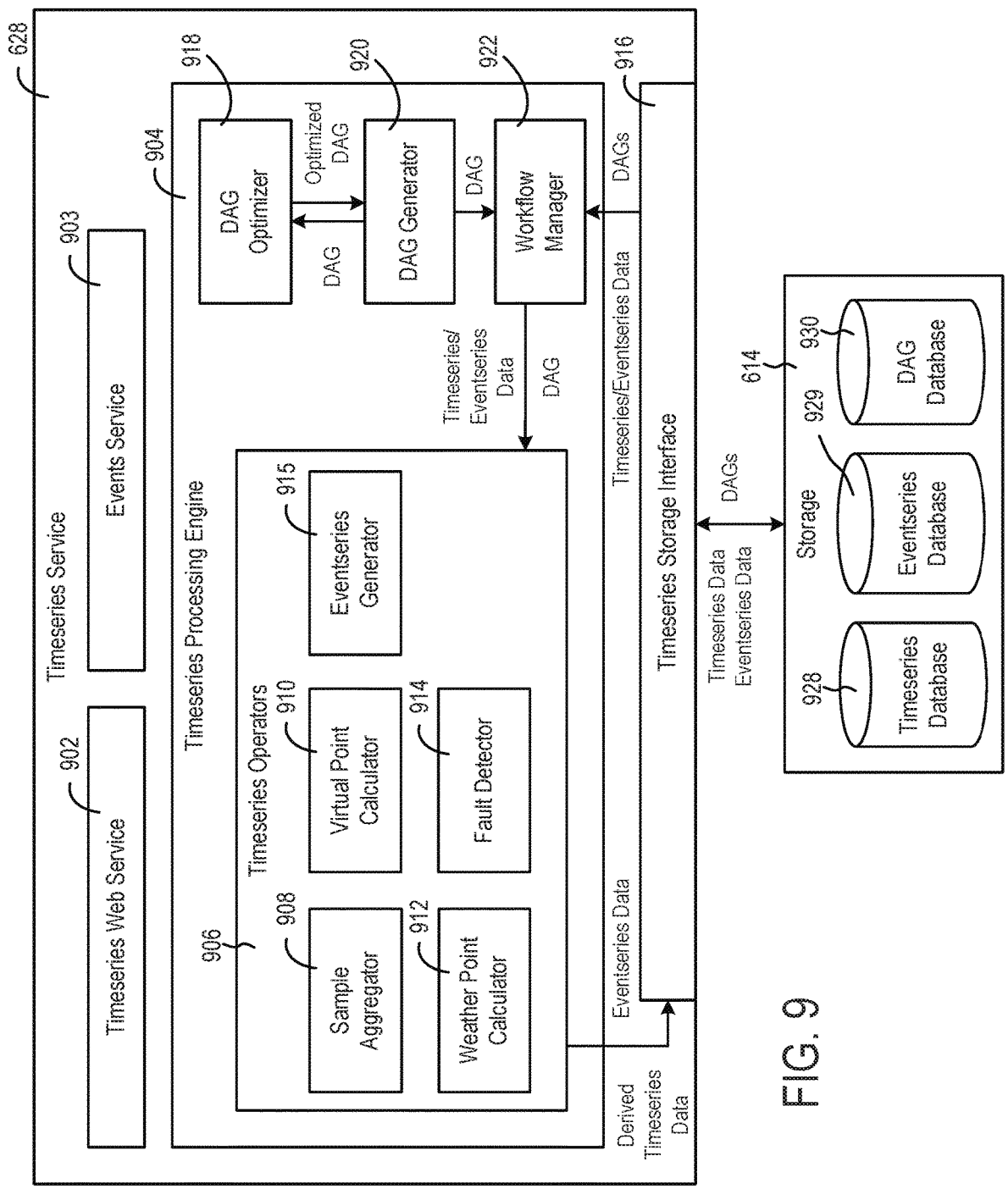
FIG. 9 is a block diagram illustrating timeseries service of FIG. 6 in greater detail, according to some exemplary embodiments.

Referring now to FIG. 9, a block diagram illustrating timeseries service 628 in greater detail is shown, according to some embodiments. Timeseries service 628 is shown to include a timeseries web service 902, an events service 903, a timeseries processing engine 904, and a timeseries storage interface 916. Timeseries web service 902 can be configured to interact with web-based applications to send and/or receive timeseries data. In some embodiments, timeseries web service 902 provides timeseries data to web-based applications. For example, if one or more of applications 630 are web-based applications, timeseries web service 902 can provide derived timeseries data and/or raw timeseries data to the web-based applications. In some embodiments, timeseries web service 902 receives raw timeseries data from a web-based data collector. For example, if data collector 612 is a web-based application, timeseries web service 902 can receive raw data samples or raw timeseries data from data collector 612. In some embodiments, timeseries web service 902 and entity service web service 702 may be integrated as parts of the same web service.

Timeseries storage interface 916 can be configured to store and read samples of various timeseries (e.g., raw timeseries data and derived timeseries data) and eventseries (described in greater detail below). Timeseries storage interface 916 can interact with storage 614. For example, timeseries storage interface 916 can retrieve timeseries data from a timeseries database 928 within storage 614. In some embodiments, timeseries storage interface 916 reads samples from a specified start time or start position in the timeseries to a specified stop time or a stop position in the timeseries. Similarly, timeseries storage interface 916 can retrieve eventseries data from an eventseries database 929 within storage 614. Timeseries storage interface 916 can also store timeseries data in timeseries database 928 and can store eventseries data in eventseries database 929. Advantageously, timeseries storage interface 916 provides a consistent interface which enables logical data independence.

In some embodiments, timeseries storage interface 916 stores timeseries as lists of data samples, organized by time. For example, timeseries storage interface 916 can store timeseries in the following format:

$$[< key, timestamp_1, value_1 >, < key, timestamp_2, value_2 >, < key, timestamp_3, value_3 >]$$

where key is an identifier of the source of the data samples (e.g., timeseries ID, sensor ID, device ID, etc.), timestamp identifies a time associated with the ith sample, and $value_i$ indicates the value of the ith sample.

In some embodiments, timeseries storage interface 916 stores eventseries as lists of events having a start time, an end time, and a state. For example, timeseries storage interface 916 can store eventseries in the following format:

$$[< eventID_1, start\_timestamp_1, end\_timestamp_1, state_1 >, \ldots, < eventID_N, start\_timestamp_N, end\_timestamp_N, state_N >]$$

where $eventID_i$ is an identifier of the ith event, $start\_timestamp_i$ is the time at which the ith event started, $end\_timestamp_i$ is the time at which the ith event ended, state describes a state or condition associated with the ith event (e.g., cold, hot, warm, etc.), and N is the total number of events in the eventseries.

In some embodiments, timeseries storage interface 916 stores timeseries and eventseries in a tabular format. Timeseries storage interface 916 can store timeseries and eventseries in various tables having a column for each attribute of the timeseries/eventseries samples (e.g., key, timestamp, value). The timeseries tables can be stored in timeseries database 928, whereas the eventseries tables can be stored in eventseries database 929. In some embodiments, timeseries storage interface 916 caches older data to storage 614 but stores newer data in RAM. This may improve read performance when the newer data are requested for processing.

In some embodiments, timeseries storage interface 916 omits one or more of the attributes when storing the timeseries samples. For example, timeseries storage interface 916 may not need to repeatedly store the key or timeseries ID for each sample in the timeseries. In some embodiments, timeseries storage interface 916 omits timestamps from one or more of the samples. If samples of a particular timeseries have timestamps at regular intervals (e.g., one sample each minute), timeseries storage interface 916 can organize the samples by timestamps and store the values of the samples in a row. The timestamp of the first sample can be stored along with the interval between the timestamps. Timeseries storage interface 916 can determine the timestamp of any sample in the row based on the timestamp of the first sample and the position of the sample in the row.

In some embodiments, timeseries storage interface 916 stores one or more samples with an attribute indicating a change in value relative to the previous sample value. The change in value can replace the actual value of the sample when the sample is stored in timeseries database 928. This allows timeseries storage interface 916 to use fewer bits when storing samples and their corresponding values. Timeseries storage interface 916 can determine the value of any sample based on the value of the first sample and the change in value of each successive sample.

In some embodiments, timeseries storage interface 916 invokes entity service 626 to create data entities in which samples of timeseries data and/or eventseries data can be stored. The data entities can include JSON objects or other types of data objects to store one or more timeseries samples and/or eventseries samples. Timeseries storage interface 916 can be configured to add samples to the data entities and read samples from the data entities. For example, timeseries storage interface 916 can receive a set of samples from data collector 612, entity service 626, agent service 638, voice assist service 640, timeseries web service 902, events service 903, and/or timeseries processing engine 904. Timeseries storage interface 916 can add the set of samples to a data entity by sending the samples to entity service 626 to be stored in the data entity, for example, or may directly interface with the data entity to add/modify the sample to the data entity.

Timeseries storage interface 916 can use data entities when reading samples from storage 614. For example, timeseries storage interface 916 can retrieve a set of samples from storage 614 or from entity service 626, and add the samples to a data entity (e.g., directly or via entity service 626). In some embodiments, the set of samples include all samples within a specified time period (e.g., samples with timestamps in the specified time period) or eventseries samples having a specified state. Timeseries storage interface 916 can provide the samples in the data entity to timeseries web service 902, events service 903, timeseries processing engine 904, applications 630, and/or other components configured to use the timeseries/eventseries samples.

Still referring to FIG. 9, timeseries processing engine 904 is shown to include several timeseries operators 906. Timeseries operators 906 can be configured to apply various operations, transformations, or functions to one or more input timeseries to generate output timeseries and/or eventseries. The input timeseries can include raw timeseries data and/or derived timeseries data. Timeseries operators 906 can be configured to calculate aggregate values, averages, or apply other mathematical operations to the input timeseries. In some embodiments, timeseries operators 906 generate virtual point timeseries by combining two or more input timeseries (e.g., adding the timeseries together), creating multiple output timeseries from a single input timeseries, or applying mathematical operations to the input timeseries. In some embodiments, timeseries operators 906 perform data cleansing operations or deduplication operations on an input timeseries. In some embodiments, timeseries operators 906 use the input timeseries to generate eventseries based on the values of the timeseries samples. The output timeseries can be stored as derived timeseries data in storage 614 as one or more timeseries data entities. Similarly, the eventseries can be stored as eventseries data entities in storage 614.

In some embodiments, timeseries operators 906 do not change or replace the raw timeseries data, but rather generate various "views" of the raw timeseries data (e.g., as separate data entities) with corresponding relational entities defining the relationships between the raw timeseries data entity and the various views data entities. The views can be queried in the same manner as the raw timeseries data. For example, samples can be read from the raw timeseries data entity, transformed to create the view entity, and then provided as an output. Because the transformations used to create the views can be computationally expensive, the views can be stored as "materialized view" data entities in timeseries database 928. Instances of relational entities can be created to define the relationship between the raw timeseries data entity and the materialize view data entities. These materialized views are referred to as derived data timeseries throughout the present disclosure.

Timeseries operators 906 can be configured to run at query time (e.g., when a request for derived data timeseries is received) or prior to query time (e.g., when new raw data samples are received, in response to a defined event or trigger, etc.). This flexibility allows timeseries operators 906 to perform some or all of their operations ahead of time and/or in response to a request for specific derived data timeseries. For example, timeseries operators 906 can be configured to pre-process one or more timeseries that are read frequently to ensure that the timeseries are updated whenever new data samples are received, and the pre-processed timeseries may be stored in a corresponding data entity for retrieval. However, timeseries operators 906 can be configured to wait until query time to process one or more timeseries that are read infrequently to avoid performing unnecessary processing operations.

In some embodiments, timeseries operators 906 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a DAG database 930 within storage 614, or internally within timeseries processing engine 904. DAGs can be retrieved by workflow manager 922 and used to determine how and when to process incoming data samples. Exemplary systems and methods for creating and using DAGs are described in greater detail below.

Timeseries operators 906 can perform aggregations for dashboards, cleansing operations, logical operations for rules and fault detection, machine learning predictions or classifications, call out to external services, or any of a variety of other operations which can be applied to timeseries data. The operations performed by timeseries operators 906 are not limited to timeseries data. Timeseries operators 906 can also operate on event data or function as a billing engine for a consumption or tariff-based billing system. Timeseries operators 906 are shown to include a sample aggregator 908, a virtual point calculator 910, a weather point calculator 912, a fault detector 914, and an eventseries generator 915.

Still referring to FIG. 9, timeseries processing engine 904 is shown to include a DAG optimizer 918. DAG optimizer 918 can be configured to combine multiple DAGs or multiple steps of a DAG to improve the efficiency of the operations performed by timeseries operators 906. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 918 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 918 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 918 schedules timeseries operators 906 to nodes where data is resident in memory in order to further reduce the amount of data required to be loaded from the timeseries database 928.

Timeseries processing engine 904 is shown to include a directed acyclic graph (DAG) generator 920. DAG generator 920 can be configured to generate one or more DAGs for each raw data timeseries. Each DAG may define a workflow or sequence of operations which can be performed by timeseries operators 906 on the raw data timeseries. When new samples of the raw data timeseries are received, workflow manager 922 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 908 can use the DAG to identify the duration of the time window (e.g., an hour, a day, a week, etc.) over which the data aggregation operation will be performed. Sample aggregator 908 can use the timestamps of the data samples in the timeseries provided as an input to the DAG to identify the location of the time window (i.e., the start time and the end time). Sample aggregator 908 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Cloud Building Management Platform Agent Service

Figure 10:
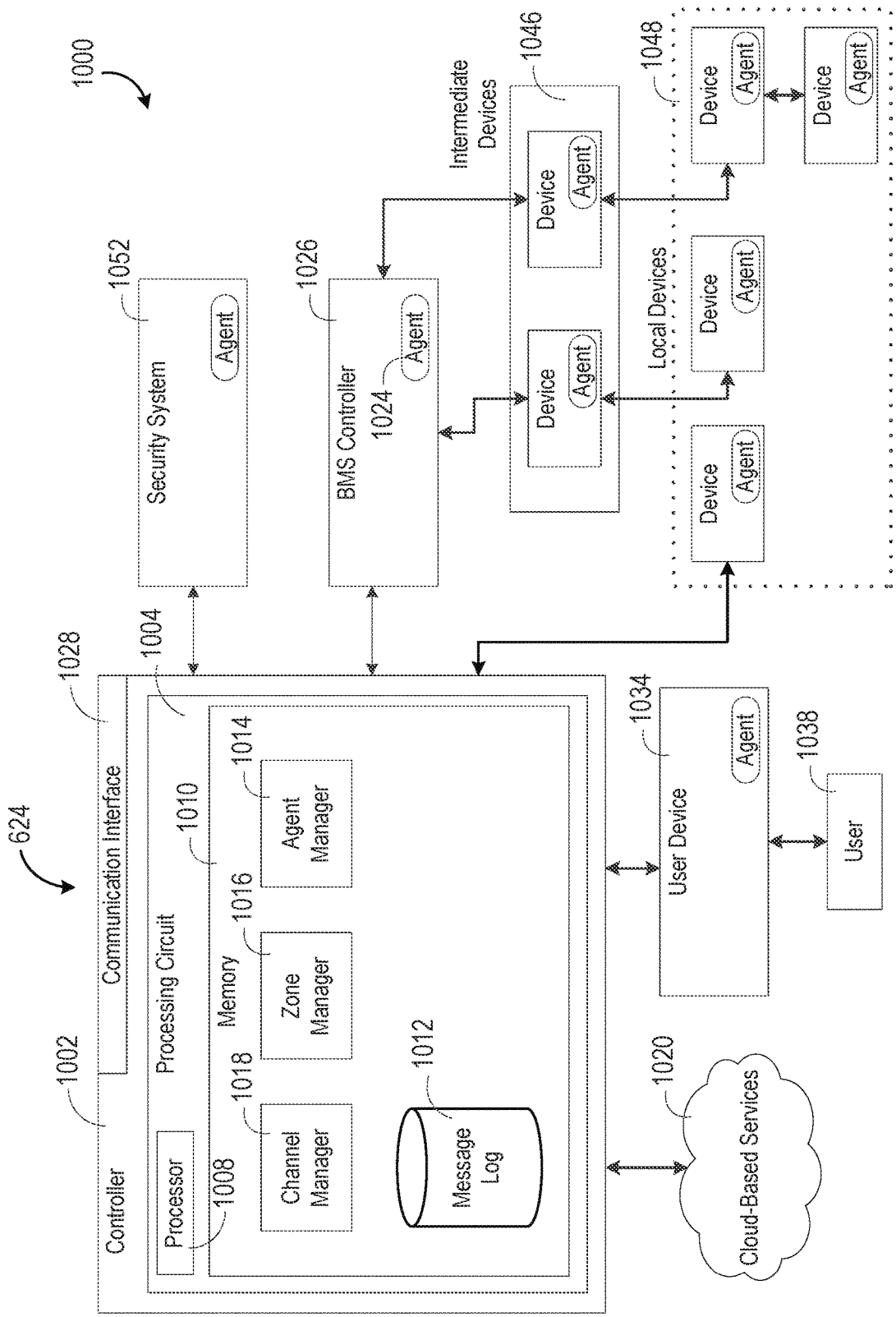
FIG. 10 is a block diagram illustrating agent service of FIG. 6 in greater detail, according to some exemplary embodiments.

Turning now to FIG. 10, a block diagram illustrating agent service 624 in greater detail is shown, according to some embodiments. In various embodiments, an agent-based communication system 1000 can be configured to facilitate communications among various devices, including voice assist devices, IoT devices, sensors, building subsystems, equipment, and other devices. In some embodiments, communication to a device partially depends on the device's relationship to one or more zones or spaces. A communication channel may be generated for each zone or space, and an "agent" may be provided for each device. An agent may be configured to publish messages to the communication channel and/or subscribe to the communication channel, allowing the agent to receive messages published to the communication channel. In some embodiments, the system 1000 may be a part of any of the BMS systems described above. Further, the system 1000 may be a peer-to-peer (P2P) network, such as a Verisys system from Johnson Controls.

In some embodiments, the agent-based communication system 1000 includes the agent service 624. The agent service 624 includes a controller 1002, which may be a dedicated controller within a BMS. In one embodiment, the controller 1002 is a cloud-based server (i.e. an internet-based server). For example, the controller 1002 may be physically located in one or more server farms and accessible via an internet connection. In some examples, the controller 1002 may be a standalone device in a peer-to-peer (P2P) network, such as a Verisys system from Johnson Controls. The controller 1002 may include a processing circuit 1004. The processing circuit 1004 may include a processor 1008 and a memory 1010. The processor 1008 may be a general purpose or specific purpose processor, an application specific integrated circuit (ASIC), one or more field programmable gate arrays (FPGAs), a group of processing components, or other suitable processing components. The processor 1008 is configured to execute computer code or instructions stored in the memory 1010 or received from other computer readable media (e.g., CDROM, network storage, a remote server, etc.).

The memory 1010 may include one or more devices (e.g., memory units, memory devices, storage devices, etc.) for storing data and/or computer code for performing and/or facilitating the various processes described in the present disclosure. The memory 1010 may include random access memory (RAM), read-only memory (ROM), hard drive storage, temporary storage, non-volatile memory, flash memory, optical memory, or any other suitable memory for storing software objects and/or computer instructions. The memory 1010 may include database components, object code components, script components, or any other type of information structure for supporting the various activities and information structures described in the present disclosure. The memory 1010 may be communicably connected to the processor 1008 via the processing circuit 1004 and may include computer code for executing (e.g., by the processor 1008) one or more processes described herein. When the processor 1008 executes instructions stored in the memory 1010, the processor 1008 generally configures the processing circuit 1004 to complete such activities.

The memory 1010 is shown to include a channel manager 1018, a zone manager 1016, an agent manager 1014, and a message log database 1012. Although the channel manager 1018, the zone manager 1016, the agent manager 1014, and the message log database 1012 are shown in the memory 1010, in other embodiments one or more are provided separately from the memory 1010, such as within the BMS controller 1026, the security system 1052, or the cloud-based services 1020. In some embodiments, the cloud-based services 1020 may include the other services described in the cloud building management platform 620 as shown in FIG. 6.

In some embodiments, the agent manager 1014 maintains a record of all agents previously generated and active within the system 1000. Further the agent manager 1014 may also maintain real time data relating to which agents are currently active, and which agents are not currently active. The agent manager 1014 may further maintain real time data relating to which device within the system 1000 a particular agent is currently associated with. For example, the agent 1024 may be associated with a BMS controller 1026 within a BMS of the system 1000. The BMS can be any combination of BMS devices as described herein. Further, the BMS can be understood to be a residential system, such as a home controller.

The agent manager 1014 may generate a number of agents, such as agent 1024, for use in the system 1400. The agents, as described herein, may be software applications that can run automated tasks (scripts). For example, the agents may be software applications that can read and/or write data to one or more devices of the system. In one embodiment, the agents may be able to generate their own software, and inject the software into one or more devices it is associated with. The agents may further be capable of communicating with other agents. The agent manager 1014 may generate an agent based on received information. In some embodiment, the agents are generated to perform a defined task. In other embodiments, the agents are generated to perform a defined set of tasks. In still further embodiments, the agents are generated having a desired goal, and allowed to determine how to meet the desired goal. In some examples, a generalized framework can be provided to a generated agent to provide constraints as to how the goal may be achieved. In further embodiments, the agent manager 1014 may modify an existing agent. For example, the agent manager 1014 may modify an existing agent to provide more functionality. In other examples, the agent manager 1014 may update the agent with additional information related to the device the agent is associated with, such as a new firmware ("FW") update, or additional hardware (e.g. a new I/O board for a controller). The agent manager 1014 may maintain a record of each agent (e.g., agent 1024) being associated with the BMS controller 1026, as well as the current status of the agent.

The agent manager 1014 may communicate the generated agents to the BMS via a communication interface 1028. The communication interface 1028 may be one or more wireless or wired interfaces. In some embodiments, the communication interface 1028 may include a wireless interface such as cellular (3G, 4G, LTE, CDMA, etc.), Wi-Fi, ZigBee, Bluetooth, RF, LoRa, etc. Additionally, the communication interface 1028 may include wired interfaces such as USB, Firewire, Lightning Connectors, CAT5 (wired internet), UART, serial (RS-232, RS-485), etc. In some embodiments, the communication interface 1028 may include a network connection, such as a BACnet network connection.

In some embodiments, the zone manager 1016 is configured to define a zone within one or more buildings or spaces. In some embodiments, the zone manager 1016 can be configured to define a building zone hierarchy that maps each room or portioned space within each floor of a building. In this regard, the zone manager 1016 can be configured to map or define each device within the building zone hierarchy, for example by mapping the device to a building space (e.g., a room of a building floor).

In some embodiments, the zone manager 1016 is configured to define a building control zone. The building control zone can be associated with a control circuit (e.g., HVAC controller) that regulates operation of a device (e.g., a thermostat) in response to an input, such as data point values of a building sensor (e.g., a temperature sensor) or voice assist device. In this regard and as described herein, the channel manager can be configured to generate a communication channel for the building control zone and register agents associated with devices to the generated communication channel.

In some embodiments, the zone manager 1016 is configured to define a physical location zone and/or a geolocation zone. The physical location zone and/or the geolocation zone can relate to a physical location of a person (e.g., an occupant) or a device (e.g., a voice assist device), such as a GPS position or a location within a building. In some embodiments, the physical location zone generally corresponds to a static location and the geolocation zone generally corresponds to a moving location. Any size or type of physical location zone and geolocation zone can be used. For example, a geolocation zone can correspond to a circular area having a 10-meter diameter with the device (e.g., a voice assist device) at the center. In some embodiments, the physical location zone and/or geolocation zone size can vary based on an input condition. For example, the zone manager 1016 can be configured to increase (or decrease) the size of the geolocation zone when a distance of the computing device relative to a location exceeds a particular threshold distance value.

In some embodiments, a location of a person (or occupant) can be determined based on any method disclosed herein, such as location information received from a device (e.g., a voice assist device or the user device 1034) associated with a person. The zone manager 1016 can be configured to generate a geolocation zone that follows the device. For example, the zone manager 1016 can determine a location of a voice assist device (e.g., a mobile device with a voice assist application installed thereon) within the building by using GPS information of the device. In another example, the zone manager 1016 can measure signal strength of the device relative to nearby known Wi-Fi access points or installed Bluetooth beacons, and can triangulate the approximate location of the device within the building. In another example, the zone manager 1016 can use dead reckoning methods to estimate the current position of the device by using a previously determined position, for example, by estimating the distance moved using data from different sensors on the device or from other devices (e.g., other voice assist devices). However, the present disclosure is not limited thereto, and any suitable methods or techniques, or combinations thereof, may be used to determine the location of the voice assist device within the building.

The channel manager 1018 can be configured to generate a communication channel associated with a zone, and to manage registration of an agent to the communication channel. In this regard, when an agent is registered to a communication channel, the agent may receive and/or publish messages over the communication channel as described herein. For example, an agent associated with the device (e.g., a voice assist device, sensor, and the like) may be registered to a communication channel associated with a physical location zone when the geolocation overlaps with a portion of the physical location zone. In some embodiments, the channel manager 1018 can be configured to create a communication channel associated with a physical location zone in response to an occupancy level.

In some embodiments, the channel manager 1018 can be configured to register a device during commissioning of the device. For example, if a new device is added and mapped to a building space (e.g., a room or floor in a building), channel manager 1018 can be configured to automatically register the device to a corresponding communication channel. In this regard, the zone manager 1016 can be configured to map the device to a particular zone of the building, e.g., a physical location zone and/or a building control zone.

In some embodiments, the channel manager 1018 can be configured to create and/or manage a communication channel based on attributes associated with one or more agents. In an example implementation, employees of a business can each be associated with a computing device, whereby an agent associated with the computing device includes attribute values indicating a job title, experience level, a health information, etc. The channel manager 1018 may be configured to create and/or manage a communication channel, for example to ensure the safety of the employees, mitigate business risks, and the like.

In some implementations, the channel manager 1018 is configured to perform security related tasks for a communication channel. In some embodiments, the channel manager 1018 can be configured to perform an authentication process prior to or during registration of an agent to a communication channel. Any suitable authentication process may be used, including password, tokenization, biometric, and/or multi-factor systems. In some embodiments, the authentication process may vary depending upon a level of access or risk associated with registration of an agent to a communication channel.

In some embodiments, the channel manager 1018 is configured to perform an authorization process to determine whether a particular agent has subscription access and/or a level of subscription access. For example, an agent associated with a temperature sensor may not be authorized to subscribe to messages, even though the agent is authorized to publish messages on a communication channel (e.g., relating to temperature measurements). In contrast, an agent associated with a thermostat may also be authorized to subscribe to messages, for example to receive messages with information relating to a temperature set-point. In either example, authorization may or may not be limited, e.g., to all messages of the channel, to building control messages of the channel, to temperature-related messages of the channel, etc.

As another example implementation, an agent associated with a computing device of an independent contractor may have only limited subscription access to messages published over a channel (e.g., to receive security alerts). In contrast, an agent associated with a computing device of a system level administrator or top-level executive may be authorized to receive all messages published over a channel.

In some embodiments, the channel manager 1018 is configured to perform an authorization process to determine whether a particular agent has publication access and/or a level of publication access. Publication access may be selectively configured based on the type of device, for example to limit the number of messages published over a channel and the corresponding data on the channel. For example, an agent associated with a building device may not have publication authorization or limited publication authorization based on a particular control circuit and inputs therein.

In some embodiments, the channel manager 1018 is configured to store authentication and/or authorization information as one or more attributes (e.g., data entities) of an agent. In some embodiments, the channel manager 1018 may be configured to interact with other devices or systems described herein (e.g., security service 622, entity service 626, timeseries service 628, voice assist service 640, and the like) to facilitate authentication and/or authorization. In some embodiments, authentication and/or authorization processes are handled by other devices or systems described herein, and not by the channel manager 1018. In some embodiments, authentication and/or authorization processes are handled by one or more agents.

In some embodiments, the channel manager 1018 is configured to store published messages of a communication channel in the message log database 1012. In some embodiments, an agent can be configured to retrieve stored messages. For example, in some embodiments an agent may be configured with an attribute relating to whether the agent has an "active" status, e.g., whether the agent is actively receiving and/or publishing messages to the channel. For example, an agent with subscription to a communication channel may be "inactive," such that the agent does not actively receive published messages. In this regard, the agent can subsequently retrieve unreceived messages from a database, as described herein.

The user device 1034 may be any device capable of communicating to the controller 1002, as well as providing an interface for a user 1038 to interact with the system 1000. In some embodiments, the user device 1034 may include personal computing devices, such as smart phones (iPhone, Android phone, Windows phone), tablet computers (iPad, Android Tablet, Windows Surface, etc.), laptop computers, and/or desktop computers. The user device 1034 may further include a stand-alone device, such as a smart speaker.

The BMS controller 1026 may be any suitable BMS controller as described herein. In some embodiments, the BMS controller 1026 may be a dedicated BMS interface device, such as an Athens Smart Hub device from Johnson Controls. In some embodiments, the controller 1002 is configured to communicate with the intermediate devices 1046 via the BMS controller 1026. Each of the intermediate devices 1046 and the local devices 1048 may be any voice assist device, sensor, IoT device, building equipment, and the like, as described herein. In some embodiments, the intermediate devices 1046 may include device controllers, sub-system controllers, RTU's, AHU's, and the like. In some embodiments, the local devices 1048 may include thermostats, valves, switches, actuators, sensors, and the like. As shown in FIG. 10, there may be no direct connection between the agent manager 1014 and the local devices 1048. Accordingly, the processing circuit 1004 may transmit the agent generation parameters to the local device 1048 via the BMS controller 1026 and one or more of the intermediate devices 1046.

In some embodiments, the agent generation parameters may include instructions to the BMS controller 1026 and the intermediate device 1046 to pass the agent generation parameters to the local device 1048 for installation. In still further embodiments, the agent generation parameters may be a fully functional agent, which, upon being received by the BMS controller 1026, can further propagate itself to the local device 1048 via the intermediate device 1046. For example, agent generation parameters may include system data, which allows the agent to map a path to the associated local device 1016. Once the agent generation parameters have been received at local device 1048, an agent can install itself onto local device 1048. In some embodiments, the agent parameters are installed on a memory of the local device 1048, and an executable program file is executed using a processing device of the local device, thereby generating the agent within the local device 1048.

The security system 1052 may include multiple elements associated with a facility or building security system. For example, the security system 1052 can include multiple devices such as occupancy sensors or systems, cameras, microphones, motion detectors, thermal sensors, access devices (RFID locks, biometric locks, etc.), entry logs, etc. In one embodiment, the security system 1052 provides data to the controller 1002. The data may include occupancy data provided by the motion detectors and/or thermal sensors. In one embodiment, the occupancy data may be provided to the cloud based services 1020 for processing via the controller 1002 or other services (e.g., security service 622, analytics service 624, entity service 626, timeseries service 628, voice assist service 640, and the like). Further, the data may include video and/or digital images provided by the cameras. In one embodiment, the digital images may be provided to the cloud-based services 1020 for processing via the controller 1002 or the other services. For example, the cloud-based services 1020 may further include a gesture recognition service, such as Microsoft Kinect.

Cloud Building Management Platform Voice Assist Service

Figure 11:
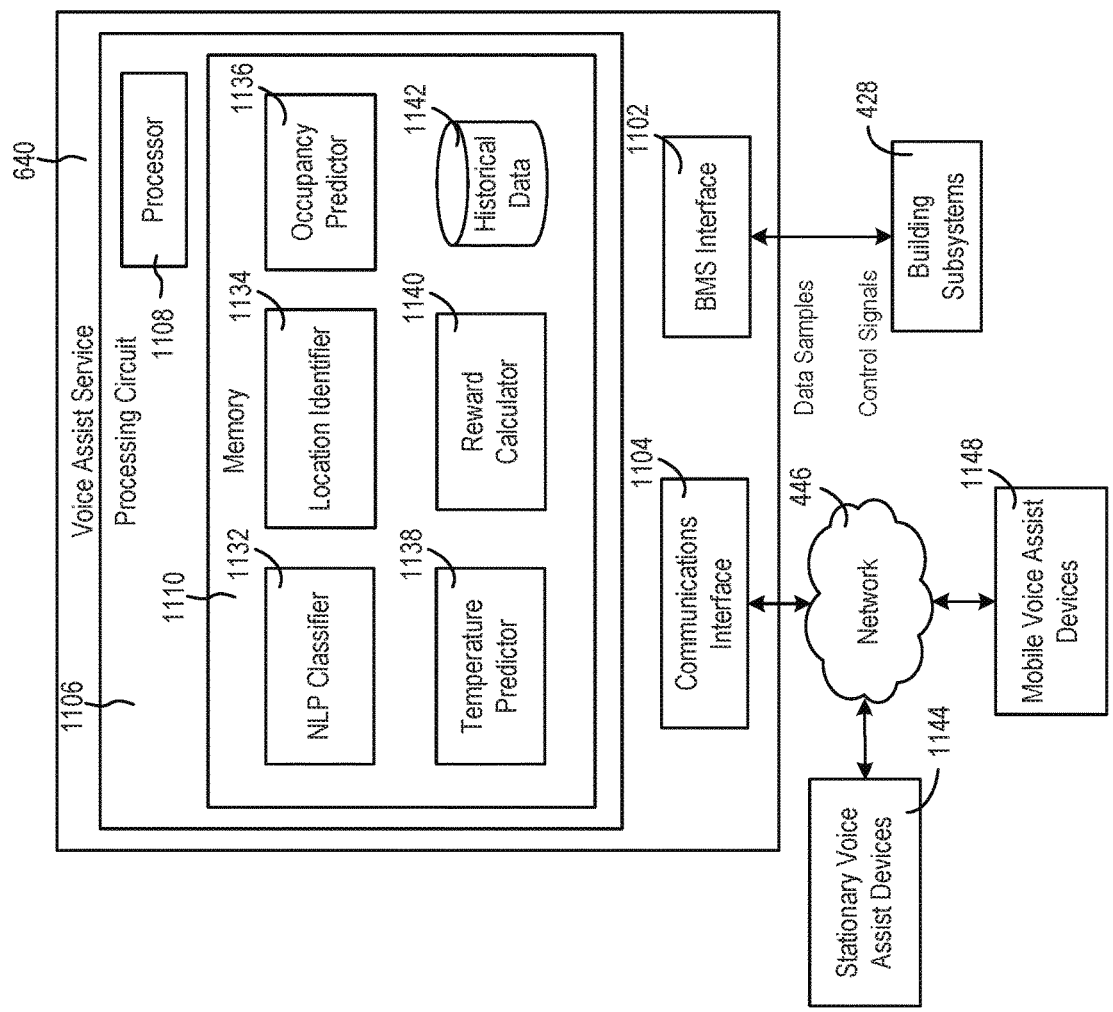
FIG. 11 is a block diagram illustrating voice assist service of FIG. 6 in greater detail, according to some exemplary embodiments.

Referring now to FIG. 11, a block diagram illustrating voice assist service 640 in greater detail is shown, according to various embodiments. In various embodiments, the voice assist service 640 is configured to analyze verbal (or spoken) natural language statements uttered by the occupant (also referred herein as utterances or natural language utterances) to determine whether the temperature of a corresponding zone or space should be increased, decreased, or left alone (e.g, unchanged). In various embodiments, voice assist service 640 can be implemented as part of the cloud building management platform 620, any of the BMS systems described above, on one or more dedicated computers or servers, or as an application running on one or more devices (e.g., the voice assist devices 1144 and 1148). Further, the components of voice assist service 640 can be integrated within a single device (e.g., a supervisory controller, a BMS controller, etc.) or distributed across multiple separate systems or devices. In other embodiments, some or all of the components of voice assist service 640 can be implemented as part of a cloud-based computing system configured to receive and process data from one or more building management systems. In other embodiments, some or all of the components of voice assist service 640 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

Voice assist service 640 is shown to include a BMS interface 1102 and a communications interface 1104. The BMS interface 1102 and the communications interface 1104 may be the same as or similar to the BMS interface 602 and the communications interface 604, respectively, as described with reference to FIG. 6. For example, interfaces 1102 and 1104 can include wired or wireless communications interfaces (e.g., jacks, antennas, transmitters, receivers, transceivers, wire terminals, etc.) for conducting data communications with building subsystems 428 or other external systems or devices. Communications conducted via interfaces 1102 and 1104 can be direct (e.g., local wired or wireless communications) or via a communications network 446 (e.g., a WAN, the Internet, a cellular network, etc.).

Communications interface 1104 can facilitate communications between voice assist service 640 and one or more voice assist devices 1144 and 1148 that detect (or monitor for) verbal (or spoken) utterances by one or more occupants. In some embodiments, the voice assist devices 1144 and 1148 may include stationary voice assist devices 1144 (e.g., stand-alone smart speakers, desktops, other computing devices, and the like, that are mounted at or otherwise distributed across various locations within the building) and/or mobile voice assist devices 1148 (e.g., an occupant's dedicated mobile device having a voice assist application installed thereon, such as a mobile phone, tablet, laptop, and the like). The voice assist devices 1144 and 1148 send utterance data corresponding to the detected utterances to the voice assist service 640 via the communications interface 1104. In some embodiments, the utterance data may include timeseries data or derived timeseries data that is stored in a historical data storage device 1142 as a data entity. In this case, the data entity may be associated with an object entity corresponding to the occupant and/or the voice assist device via a relational entity defining a relationship between the occupant entity or voice assist device entity and the utterance data entity.

BMS interface 1102 can facilitate communications between voice assist service 640 and building subsystems 428 (e.g., directly or via BMS 600). Voice assist service 640 can be configured to communicate (e.g., directly or via BMS 600) with building subsystems 428 using any of a variety of building automation systems protocols (e.g., BACnet, Modbus, ADX, etc.). In some embodiments, voice assist service 640 receives data samples from building subsystems 428 and provides control signals to building subsystems 428 via BMS interface 1102. For example, voice assist service 640 may receive temperature set-point data, temperature sensor data, and the like, from the HVAC subsystem 440 (e.g., via BMS 600), and may send control signals to the HVAC subsystem 440 to control the temperature (or temperature set-point) of a particular zone or space. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10.

Still referring to FIG. 11, voice assist service 640 is shown to include one or more processing circuits 1106 including one or more processors 1108 and memory 1110. Each of the processors 1108 can be a general purpose or specific purpose processor, an application specific integrated circuit (ASIC), one or more field programmable gate arrays (FPGAs), a group of processing components, or other suitable processing components. Each of the processors 1108 can be integrated within a single device or distributed across multiple separate systems or devices. For example, each of the processors 1108 may be an internal processor with respect to voice assist service 640 or may be an external processor implemented as part of a cloud-based computing system configured to process the utterance data. Each of the processors 1108 is configured to execute computer code or instructions stored in memory or received from other computer readable media (e.g., CDROM, network storage, a remote server, etc.).

Memory 1110 can include one or more devices (e.g., memory units, memory devices, storage devices, etc.) for storing data and/or computer code for performing and/or facilitating the various processes described in the present disclosure. Memory 1110 can include random access memory (RAM), read-only memory (ROM), hard drive storage, temporary storage, non-volatile memory, flash memory, optical memory, or any other suitable memory for storing software objects and/or computer instructions. Memory 1110 can include database components, object code components, script components, or any other type of information structure for supporting the various activities and information structures described in the present disclosure. Memory 1110 can be communicably connected to the processors 1108 via the processing circuits 1106 and can include computer code for executing (e.g., by processor 1108) one or more processes described herein.

Memory 1110 is shown to include a natural language processing (NLP) classifier 1132, a location identifier 1134, an occupancy predictor 1136, a temperature predictor 1138, a reward calculator 1140, and the historical data storage device 1142. While the historical data storage device 1142 is shown in FIG. 11 as being part of the memory 1110, the present disclosure is not limited thereto, and in various embodiments, the historical data storage device 1142 may be internal storage or external storage. For example, the historical data storage device 1142 may be part of storage 614 in FIG. 6, internal storage with relation to voice assist service 640, and/or may include a remote database, cloud-based data hosting, or other remote data storage.

In various embodiments, the NLP classifier 1132 may receive natural language utterance data from one or more voice assist devices 1144 and 1148. The utterance data may be in text format, sound format, multimedia format, or any suitable format. For example, in some embodiments, the one or more voice assist devices 1144 and 1148 may convert the detected utterance into text using any suitable voice to text application. In other embodiments, the NLP classifier 1132 may receive the natural language utterance data from the one or more voice assist devices 1144 in any suitable sound or multimedia format. In this case, the NLP classifier 1132 may include a voice to text application to covert the utterance data into text, or may be configured to process the utterance data in the received native format (e.g., without first converting it to text). In other embodiments, the NLP classifier 1132 may processes natural language utterances into computer executable commands. For example, the NLP classifier 1132 may convert the utterance data received from the one or more voice assist devices 1144 and 1148 into a format readable by a BMS controller or the HVAC subsystem 440. While the NLP classifier 1132 is shown as part of the voice assist service 640, it is considered that the NLP classifier 1132 may be separate from the voice assist service 640, and can communicate directly with the voice assist devices 1144 and 1148. In other embodiments, the NLP classifier 1132 may be integrated into the voice assist devices 1144 and 1148.

In various embodiments, the NLP classifier 1132 analyzes the received utterance data using any suitable machine learning method to determine the content of the utterance.

For example, the NLP classifier may utilize machine learning to analyze the semantics and/or syntax of the utterance using any suitable methods, for example, such as lemmatization, segmentation, tagging, parsing, disambiguation, stemming, extraction, lexical semantics, machine translation, relationship extraction, sentiment analysis, topic segmentation and recognition, speech recognition, text to speech, any other suitable methods, or any combinations thereof. In various embodiments, the NLP classifier 1132 determines whether or not the utterance includes a sentiment relating to the temperature of a corresponding zone or space, and whether the temperature should be increased, decreased, or left alone based on the sentiment.

For example, an occupant of the zone or space may utter (e.g., verbalize or speak) a natural language statement corresponding to how cold or warm the occupant feels in the zone or space, such as, for example, "It's freezing in here," "It's so hot in here," "I'm so cold," "I wish it was a little warmer," and the like, and at least one of the voice assist devices 1144 and 1148 may detect the statement. In another example, the occupant of the zone or space may utter specific commands for adjusting the temperature of the zone or space, such as, for example, "Turn down the temperature," "Increase the temperature," "set the temperature to 72 degrees Fahrenheit," and the like, and at least one of the voice assist devices 1144 and 1148 may detect the specific commands. In various embodiments, the voice assist devices 1144 and 1148 may be configured to filter the detected statements for utterances relating to temperature, and may transmit only those utterances relating to temperature to the NLP classifier 1132 for further analysis. For example, in some embodiments, the voice assist device may monitor (or listen to) verbal conversations (e.g., all verbal conversations) uttered between one or more occupants, and may transmit only utterances relating to temperature (e.g., via keywords). In another example, the voice assist devices 1144 and 1148 may monitor (or listen) for specific "wake" words (e.g., such as "HVAC feedback," "temperature control," and the like) that trigger the voice assist devices 1144 and 1148 to transmit a subsequent (or proceeding) natural language utterance. However, the present disclosure is not limited thereto, and in other embodiments, the voice assist devices 1144 and 1148 may be configured to transmit all detected utterances to the NLP classifier 1132, and the NLP classifier may parse or otherwise identify the utterances including the sentiments relating to the temperature of the zone or space.

In some embodiments, the voice assist devices 1144 and 1148 may request confirmation before a proposed action is performed, such as "would you like to increase the temperature?," "would you like to decrease the temperature by 2 degrees Fahrenheit?," and the like. In some embodiments, the voice assist devices 1144 and 1148 may request additional information in response to detecting an utterance relating to the temperature, such as asking "how hot are you?," "how cold are you?," and the like. In some embodiments, the voice assist devices 1144 and 1148 may acknowledge the utterance or describe a proposed action, such as "increasing the temperature," "lowering the temperature," "setting the temperature to 72 degrees Fahrenheit," and the like. However, the present disclosure is not limited thereto, for example, in other embodiments, the temperature may be adjusted based on the detected and analyzed utterances without further confirmation or acknowledgment by the occupant or voice assist devices 1144 and 1148.

Still referring to FIG. 11, the location identifier 1134 determines a location within the building of the voice assist devices 1144 and 1148 associated with the received utterance. For example, in some embodiments, the location identifier 1134 can determine (e.g., directly or via entity service 626) the location of the voice assist devices 1144 and 1148 from entity data of an object entity associated with a corresponding one of the voice assist devices 1144 and 1148. In this example, a data entity containing location information of the object entity may be determined via a relational entity that defines a relationship between the data entity and the voice assist device object entity. In another example, the location of the voice assist devices 1144 and 1148 may be determined by identifying a user of the voice assist device. For example, in the case of a mobile voice assist device 1148 associated with a particular user, the location of the voice assist device may be determined by other devices associated with the particular user, such as an access keycard that was recently used to gain access to a zone or space via an access control device associated with the zone or space, for example. In another example, the voice assist devices 1144 and 1148 may transmit one or more attributes that can be used to identify the location of the voice assist devices 1144 and 1148. For example, the utterance data may include a location attribute (e.g., GPS position), and the location identifier 1134 may be configured to determine a zone or space in which the corresponding one of the voice assist devices 1144 and 1148 is located based on the location attribute. In another example, the location identifier 1134 (e.g., directly or via agent service 638) may determine the location by measuring signal strength of the corresponding one of the voice assist devices 1144 and 1148 relative to known nearby Wi-Fi access points or installed Bluetooth beacons, and may triangulate the location (e.g., the approximate location) of the corresponding one of the voice assist devices 1144 and 1148. In another example, the location identifier 1134 (e.g., directly or via agent service 638) can use dead reckoning methods to estimate the current position of the corresponding voice assist device 1144 and 1148 by using a previously determined position, for example, by estimating the distance moved using data from different sensors on the corresponding voice assist device 1144 and 1148 or from other devices (e.g., other voice assist devices 1144 and 1148). However, the present disclosure is not limited thereto, and any suitable methods or techniques, or combinations thereof, may be used to determine the location of the corresponding voice assist device 1144 and 1148 within the building.

In various embodiments, the voice assist service 640 may generate an electronic signal to control the HVAC subsystem 440 (e.g., directly or via a BMS controller) to adjust the temperature of a corresponding zone or space based on the analyzed utterance data and the determined location of the corresponding voice assist device 1144 and 1148. For example, in an embodiment, the temperature may be increased or decreased by set or pre-determined increments (e.g., 2 degrees). In another example, the temperature may be increased or decreased in random increments. In another example, the temperature may be increased or decreased by an amount determined from the historical utterance data. In some embodiments, the temperature set-point corresponding to the zone or space may be set (or adjusted) according to the utterance data. In some embodiments, the temperature set-point corresponding to the zone or space may be overridden (e.g., temporarily overridden) according to the utterance data. However, the present disclosure is not limited thereto, and the temperature may be adjusted by any suitable methods based on the utterance data. For example, the temperature may be adjusted based on on/off time of a heater or cooler according to the utterance data, irrespective of the temperature set-point.

Still referring to FIG. 11, in some embodiments, the voice assist devices 1144 and 1148 may be utilized as an occupancy sensor to detect when a corresponding zone or space is occupied. For example, when utterance data is received from a corresponding voice assist device 1144 and 1148, the occupancy predictor 1136 may determine that the zone or space corresponding to the location of the voice assist device 1144 and 1148 is occupied. In another embodiment, the voice assist devices 1144 and 1148 may be configured to transmit a signal when an utterance is detected (or first detected) in a corresponding zone or space. In some embodiments, the voice assist devices 1144 and 1148 may transmit the signal periodically (e.g., at predetermined intervals or times) to update the occupancy status of a corresponding zone or space. For example, unless the occupancy predictor 1136 receives the signal at the predetermined intervals or times, the occupancy predictor 1136 determines that the zone or space is no longer or not occupied. In another embodiment, the voice assists devices 1144 and 1148 may transmit a first signal indicating that a particular zone or space is occupied when an utterance is first detected, and may transmit a second signal indicated that the particular zone or space is no longer occupied, for example, when a time from the last time an utterance was detected in the zone or space exceeds a threshold.

In some embodiments, the occupancy predictor 1136 may store occupancy data of the zone or space in the historical data storage device 1142. The occupancy data may indicate times, dates, and other information corresponding to when the zone or space is occupied. In some embodiments, the occupancy data may be timeseries data or derived timeseries data stored as a data entity. In this case, the occupancy data entity may be associated with an object entity corresponding to the zone or space via a relational entity defining a relationship between the zone or space entity and the occupancy data entity. In some embodiments, the occupancy predictor 1136 may predict a time when a corresponding zone or space is likely to be occupied based on the historical occupancy data. In this case, the voice assist service 640 may adjust the temperature of the zone or space prior to the zone or space being occupied, so that the zone or space is at a desired (or comfortable) temperature by the time it is occupied. For example, the voice assist service 640 may cause the HVAC subsystem 440 to increase or decrease the temperature 10 minutes before the zone or space is expected to be occupied.

In some embodiments, the occupancy predictor 1136 may determine an identity of an occupant of the zone or space based on the utterance data. For example, the occupancy predictor 1136 may include a voice recognition application to analyze the utterance data to determine the identity of the occupant. In another example, if the voice assist device is a mobile device, then the occupancy predictor 1136 may identify the owner or user of the mobile device (e.g., using entity data). The occupancy predictor 1136 may store occupant data corresponding to the identified occupant in the historical data storage device 1142. The occupant data may indicate occupant identity information, times, dates, zones, and/or other information corresponding to when and where within the building the occupant is located. In some embodiments, the occupant data may be timeseries data or derived timeseries data stored as a data entity. In this case the occupant data entity may be associated with an object entity corresponding to the occupant via a relational entity defining a relationship between the occupant entity and the occupant data entity. In some embodiments, the occupancy predictor 1136 may predict when a particular occupant is likely to occupy a particular zone or space using the occupant data. In this case, the voice assist service 640 may adjust the temperature of the zone or space to be at a historically desired (or comfortable) temperature for the particular occupant based on the historical occupancy data when the particular occupant is detected in the zone or space. In some embodiments, the voice assist service 640 may adjust the temperature of the zone or space to be at the historically desired (or comfortable) temperature for the particular occupant prior to the zone or space being occupied by the particular occupant (e.g., 5 minutes prior), so that the zone or space is at the historically desired (or comfortable) temperature for the particular occupant by the time it is occupied.

In some embodiments, the voice assist service 640 may control the voice assist devices 1144 and 1148 to verbally transmit or otherwise convey announcements or other information to the occupants based on the identified location of the voice assist devices 1144 and 1148. For example, the voice assist devices 1144 and 1148 may broadcast emergency announcements, such as fires, severe weather warnings, amber alerts, and other emergency broadcasts for a general geographical area in which the voice assist devices 1144 and 1148 are located. In another example, each of the voice assist devices 1144 and 1148 that are located in a particular zone or space may be controlled to verbally transmit or otherwise convey messages or announcements pertaining to the particular zone or space. In some embodiments, the location of the voice assist device may be used to locate a particular occupant. For example, the voice assist service 640 may use occupant data associated with utterance data received from a particular voice assist device to locate a particular occupant identified via the occupant data, and may control the particular voice assist device to convey messages specifically directed to the particular occupant.

In some embodiments, the temperature predictor 1138 may analyze the historical utterance data, the historical occupancy data, the historical occupant data, and/or other data (e.g., current outside temperature, current date, current time, and/or the like) to predict the temperatures that are likely to be desired (or comfortable) in various zones or spaces. For example, the temperature predictor 1138 may determine that based on the current outside temperature, day of year, and time of day, a certain temperature has historically been desired (or comfortable) for a particular zone or space according to the historical utterance data and occupancy data. In another example, the temperature predictor may determine that a certain temperature has historically been desired (or comfortable) for a particular occupant at night time during certain months of the year based on the historical utterance data and the occupant data corresponding to the particular occupant. Accordingly, over time, the voice assist service 640 may learn to maintain the temperatures in various zones or spaces that are occupied or expected to be occupied closer to the occupant desired (or comfort) levels, instead of based on arbitrary pre-programmed temperature set-points.

Figure 12:
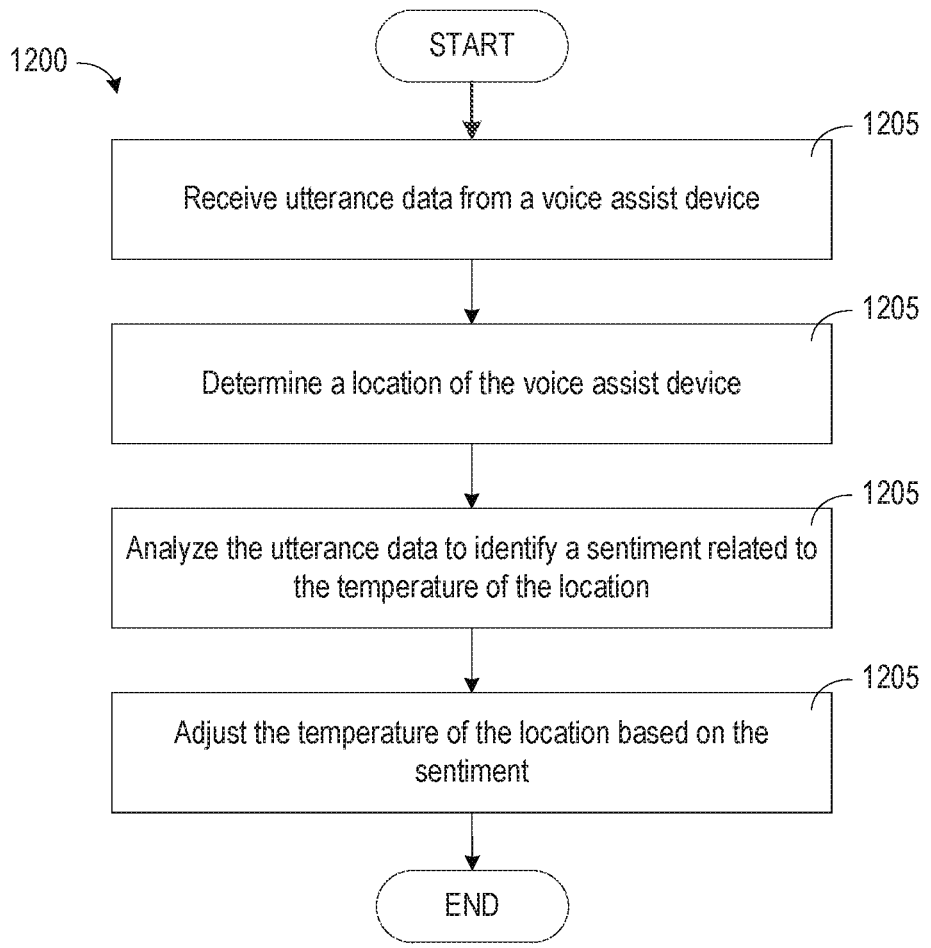
FIG. 12 is a flow diagram of a process or method for controlling the temperature based on utterance data received from a voice assist device, according to some exemplary embodiments.

Referring to FIG. 12, a flow diagram of a process or method for controlling the temperature based on utterance data received from a voice assist device is shown, according to an exemplary embodiment. According to the non-limiting example shown in FIG. 12, the process 1200 starts and utterance data is received from a voice assist device at block 1205. The voice assist device may be a stationary voice assist device (e.g., stand-alone smart speaker, desktop, other computing device, and the like) or a mobile voice assist device (e.g., an occupant's dedicated mobile device having a voice assist application installed thereon, such as a mobile phone, tablet, laptop, and the like). The utterance data corresponds to a statement or command uttered by an occupant that is detected by the voice assist device. The utterance data includes a sentiment corresponding to the temperature.

In response to receiving the utterance data, the location of the voice assist device is determined at block 1205. The location may correspond to a zone or space within a building in which the voice assist device is located. The location may be determined by any suitable methods. For example, the location can be determined from entity data corresponding to an object entity representing the voice assist device, where a data entity containing the location information is associated via a relational entity with the voice assist device object entity. In another example, the location may be determined from one or more attributes in a part (e.g., the header) of the utterance data. In another example, the location may be determined from GPS position information provided by the voice assist device. In another example, the location may be triangulated based on signal strength of the voice assist device to nearby Wi-Fi access points or Bluetooth beacons. In another embodiment, the location may be determined by dead reckoning methods.

Reinforcement Learning

In some embodiments, the voice assist service 640 may utilize machine learning techniques, such as reinforcement learning (e.g., Q-learning), to learn when and how the temperatures should be adjusted in order to achieve the desired (or comfortable) temperatures for the occupied zones or spaces, while reducing or minimizing energy consumption or costs. For example, the voice assist service 640 may learn a pattern of when to control the heating and cooling elements of the HVAC subsystem 440 to be turned on or off at various points in time referred to as epochs (e.g., every 5 minutes). Reinforcement learning is a machine learning technique that determines a reward (e.g., points or a numerical value) for an action taken in any given state, where the goal is to take actions that result in increased or maximum rewards. For example, for each epoch, a state may be defined considering the current zone or space temperature, occupancy status or time to expected occupancy, temperature set-point, current outdoor temperature, and/or the like. For any state, the HVAC subsystem may be controlled to execute one of the following actions—Heat on, Heat off, Cool on, or Cool off, where the action is governed by a reward scheme that determines the rewards for each state and corresponding action.

For example, a reward (e.g., points or a numerical value) may be calculated corresponding to the possible actions for each state according to a reward scheme, as shown in the following table for some of the possible states and corresponding actions.

| State | Action | Reward | Explanation |
| --- | --- | --- | --- |
| Zone is not occupied, zone temperature is greater than temperature set-point | Heat on | −1 | While the zone temperature is greater than the temperature set-point, the zone is not occupied so the action may be slightly penalized |
| Zone is occupied, zone temperature is greater than temperature set-point | Heat on | −3 | Because the zone is occupied and the zone temperature is greater than the temperature set-point, the action may be heavily penalized, since the heat should have been turned off and cooling should be turned on |
| Zone is occupied, zone temperature is equal to temperature set-point | Heat off | 0 | Correct action is rewarded (or not penalized) |
| Zone is occupied, zone temperature is less than temperature set-point | Heat off | −3 | Because the zone is occupied and the zone temperature is less than the temperature set-point, the action may be heavily penalized, since the heat should have been turned on |
| Zone is occupied, zone temperature is less than temperature set-point | Heat on | 0 | Correct action is rewarded (or not penalized) |

The utterance data is analyzed at block 1205 to determine whether the temperature at the location of the voice assist device should be adjusted or left unchanged. For example, the utterance data is analyzed to determine whether the occupant has indicated that he/she is hot (or warm), cold (or chilly), or comfortable. If the utterance data indicates that the occupant is hot, the temperature of the corresponding location should be cooled. If the utterance data indicates that the occupant is cold, the temperature of the corresponding location should be heated. If the utterance data indicates that the occupant is comfortable, the temperature of the corresponding location should be maintained. Accordingly, the temperature of the location is adjusted, if necessary or desired, based on the utterance data at block 1205, and the process ends.

Learning progresses with the reward scheme as an action is taken for each epoch towards a pattern where the actions are well rewarded. In simulation results based on the reinforcement learning technique with the above reward scheme, 10% savings in energy consumption compared to pre-programmed HVAC control systems have been shown.

Referring again to FIG. 11, according to various embodiments, the reward calculator 1140 may consider the utterance data in the reward formulation. The reward calculator 1140 may calculate a reward (e.g., points or a numerical value) corresponding to the possible actions for each state and considering occupant feedback received (via the voice assist devices) in response to the action taken for a corresponding state. For example, the reward calculator 1140 may define the state for each epoch considering the current zone temperature, occupancy status or time to expected occupancy (predicted using historical occupancy data), temperature set-point, current outside temperature, and occupant feedback (from utterance data). In this case, an epoch may be an incremental time period (e.g., every 5 mins) that may be overridden when occupant feedback is received.

In some embodiments, for any state, the HVAC subsystem 440 may be controlled to execute one of the following actions—Heat on, Heat off, Cool on, or Cool off, where the action is governed by a reward scheme that determines the rewards for each state, corresponding action, and resulting occupant feedback. In a non-limiting example, the reward calculator 1140 may calculate the reward according to an example reward scheme considering the possible actions for each state and the occupant feedback received in response to the actions, as shown in the following table for some of the possible states and corresponding actions.

| State | Action | Feedback | Reward | Explanation |
| --- | --- | --- | --- | --- |
| Zone is not occupied, zone temperature is greater than temperature set-point | Heat on | Not occupied | −1 | While the zone temperature is greater than the temperature set-point, the zone is not occupied so the action may be slightly penalized |
| Zone is occupied, zone temperature is greater than temperature set-point | Heat on | "Feeling warm" | −3 | Because the occupant is feeling warm, and the zone temperature is greater than the temperature set-point, the action may be heavily penalized |
| Zone is occupied, zone temperature is greater than temperature set-point | Heat off | "Feeling alright" | 0 | While the zone temperature is greater than the temperature set-point, the occupant is "feeling alright," and turning the Heat off consumes less energy than turning Cool on |
| Zone is occupied, zone temperature is greater than temperature set-point | Heat on | "Feeling alright" | −3 | While the occupant is "feeling alright," the zone temperature is greater than the temperature set-point, and turning the Heat off would consume less energy |
| Zone is occupied, zone temperature is equal to temperature set-point | Heat off | No feedback | 0 | No feedback assumes that occupant is comfortable and correct action is rewarded (or not penalized) |
| Zone is occupied, zone temperature is greater than temperature set-point | Cool on | "Feeling cold" | −1 | While the zone temperature is greater than temperature set-point, the occupant is "feeling cold" so the action may be slightly penalized |
| Zone is occupied, zone temperature is greater than temperature set-point | Cool off | "Feeling alright" | 0 | While the zone temperature is greater than the temperature set-point, the occupant is "feeling alright," and turning Cool off consumes less energy than turning Cool on |
| Zone is occupied, zone temperature is greater than temperature set-point | Cool on | "Feeling warm" | 0 | While the occupant is "feeling warm," the zone temperature is greater than the temperature set-point, so turning Cool on is the correct action and is rewarded (or not penalized) |
| Zone is occupied, zone temperature is equal to temperature set-point | Cool off | "Feeling warm" | −1 | While the zone temperature is equal to the temperature set-point, the occupant is "feeling warm" so the action may be slightly penalized |

Based on the above example reward scheme, for each epoch, the reward calculator 1140 defines the state and chooses the action that results in an increased or maximized reward according to the rewards calculated from the previous actions. For example, the HVAC subsystem 440 may be controlled to adjust the temperature corresponding to a first action (e.g., Heat on, Heat off, Cool on, or Cool off), and the reward calculator 1140 may calculate a reward for the first action considering the state, the action taken, and resulting occupant feedback. For a subsequent epoch, the HVAC subsystem 440 may be controlled to adjust the temperature corresponding to a second action (e.g., Heat on, Heat off, Cool on, or Cool off), where the second action is determined to increase or maximize the reward considering the reward resulting from the first action (and other previous actions).

In some embodiments, using machine learning with reinforcement learning techniques, the voice assist service 640 may learn a pattern of setting "correct" temperature setpoints for various zones or spaces at any particular time. In this case, the HVAC subsystem 440 may turn Heat on/off or Cool on/off by comparing the temperature set-point against the zone temperature for each state. In addition, if the HVAC subsystem 440 is capable of operating under multiple power levels, the power level may also be changed to speed up heating/cooling depending on the severity of discomfort in the occupant feedback. In this example, since the Heat on/off and Cool on/off actions are executed strictly by comparing the temperature set-point with the current temperature of the zone or space, the action becomes the temperature set-point change. For example, for a given state, the action is the temperature set-point change based on the occupant feedback, as shown in the below table as a non-limiting example for some possible states.

| State | Feedback | Action |
| --- | --- | --- |
| Zone occupied, hot season | "Feeling very hot" | Lower temperature set-point by 6 degrees Fahrenheit |
| Zone occupied, hot season | "Feeling moderately hot" | Lower temperature set-point by 2 degrees Fahrenheit |
| Zone not occupied | Not occupied | Set temperature set-point to a default that consumes very little or no energy |

With the action being the temperature set-point change, the reward is calculated for each epoch based on the temperature set-point change at any given state and resulting occupant feedback. In this case, the reward calculator 1140 may calculate the reward according to an example reward scheme considering the state, the temperature set-point change, and resulting occupant feedback, as shown in the following table for some of the potential actions and resulting occupant feedback.

action (e.g., increase temperature set-point or decrease temperature set-point), and the reward calculator 1140 may calculate a reward for the first action considering the state, the action taken, and resulting occupant feedback. For a subsequent epoch, the HVAC subsystem 440 may be controlled to adjust the temperature corresponding to a second action (e.g., increase temperature set-point or decrease temperature set-point), where the temperature set-point for the second action is determined to increase or maximize the reward considering the reward resulting from the first action (and other previous actions).

In some embodiments, the amount of increase and decrease of the temperature set-point may be limited to any suitable number of pre-defined increments, for example, such as decrease temperature set-point by 2 degrees Fahrenheit, decrease temperature set-point by 5 degrees Fahrenheit, increase temperature set-point by 2 degrees Fahrenheit, or increase temperature set-point by 5 degrees Fahrenheit. In this case, the number of pre-defined increments can be variously set or determined to include more granular changes (e.g., increase by 2 degrees Fahrenheit, increase by 4 degrees Fahrenheit, increase by 6 degrees Fahrenheit, etc., decrease by 2 degrees Fahrenheit, decrease by 4 degrees Fahrenheit, etc.) or less changes (e.g., increase by 2 degrees Fahrenheit at a time or decrease by 2 degrees Fahrenheit at a time). However, the present disclosure is not limited thereto, and the amount of increase or decrease of the temperature set-point may be dynamically determined by the voice assist service 640 as learning progresses through occupant feedback, user manual overrides, and/or the like.

In some embodiments, the reward scheme may further consider other factors and dynamically adjust the reward calculation accordingly, such as, for example, HVAC system degradation based on frequent on/off cycles, conflicting

| Action | Feedback | Reward | Explanation |
| --- | --- | --- | --- |
| Lower temperature set-point by 2 degrees Fahrenheit | "Feeling very hot" | −3 | While the temperature set-point was lowered, the occupant is still "feeling very hot," so the temperature set-point should have been further decreased |
| Lower temperature set-point by 6 degrees Fahrenheit | "Feeling moderately hot" | −1 | While the temperature set-point should still be lowered, the occupant is now "feeling moderately hot," so the action may be slightly penalized |
| Lower temperature set-point by 8 degrees Fahrenheit | "Feeling very comfortable" | +5 | The changed temperature set-point was just right, so should be rewarded |
| Lower temperature set-point by 6 degrees Fahrenheit | "Feeling very cold" | −6 | The changed temperature set-point was too much, and consumed more energy than needed, so should be heavily penalized |
| Lower temperature set-point by 6 degrees Fahrenheit | No feedback | 0 | While no feedback assumes that occupant is comfortable, the action cannot be verified and thus, is slightly rewarded (or not penalized) |
| Lower temperature set-point by 6 degrees Fahrenheit | Not occupied | −3 | Zone is not occupied so temperature set-point should have been set to default |

Based on the above example reward scheme, for each epoch, the reward calculator 1140 defines the state and chooses the action that results in an increased or maximized reward according to the rewards calculated from the previous actions. For example, the HVAC subsystem 440 may be controlled to adjust the temperature corresponding to a first occupant preferences where the reward function may perform an aggregation of the preferred temperatures to prevent or reduce oscillating set-point changes, user set or overrides of the temperature set-point, energy costs (e.g., utility tariffs at different times of day or seasons, on-site power generation, or the like), differences in set-points of adjacent or surrounding zones or spaces that can lead to thermal efficiency or occupant comfort issues, and/or the like. In some embodiments, the reward schemes may be periodically or continuously updated or tweaked depending on aggregated tangible performance measures (e.g., frequent occupant overrides). Further, in some embodiments, reward schemes learned in one building may be applied to other buildings, for example, during initialization or adaption in a different or new building.

Figure 13:
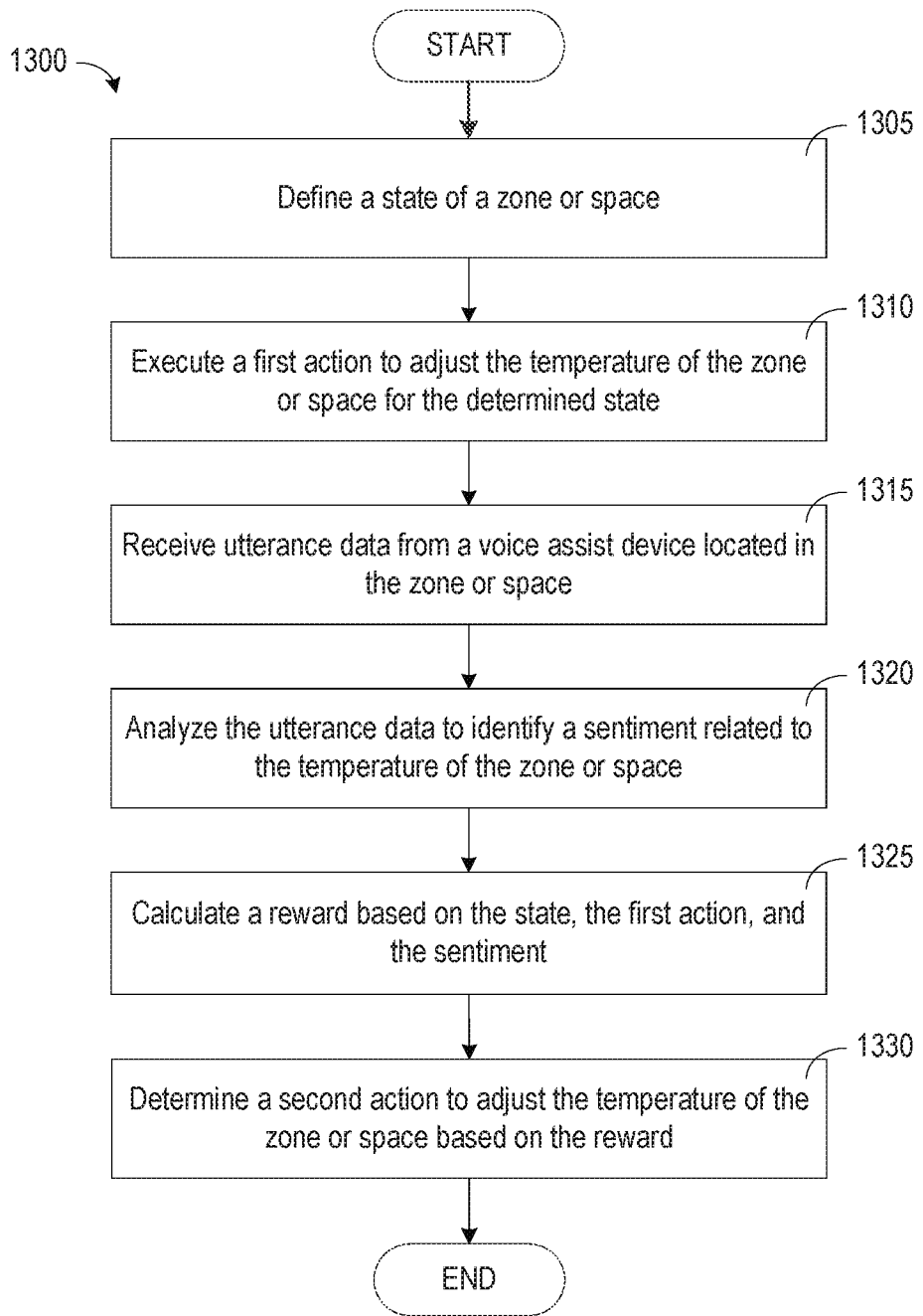
FIG. 13 is a flow diagram of a process or method for learning how to control the temperature based on reinforcement learning, according to some exemplary embodiments.

Referring now to FIG. 13, a flow diagram of a process or method for learning how to control the temperature based on reinforcement learning is shown, according to some exemplary embodiments. According to the non-limiting example shown in FIG. 13, the process 1300 starts and a state corresponding to a zone or space is defined at block 1305. The state may correspond to a current condition of the zone or space. For example, the state may be defined considering the zone temperature, occupancy status or time to expected occupancy (predicted using historical occupancy data), temperature set-point, outside temperature, and/or occupant feedback. A first action to adjust the temperature of the zone or space is executed at block 1310. For example, the first action may be to turn the heat on or off, turn the cool on or off, increase the temperature set-point, or decrease the temperature set-point.

Utterance data is received from a voice assist device located in the zone or space at block 1305. The voice assist device may be a stationary voice assist device (e.g., stand-alone smart speaker, desktop, other computing device, and the like) or a mobile voice assist device (e.g., an occupant's dedicated mobile device having a voice assist application installed thereon, such as a mobile phone, tablet, laptop, and the like). The utterance data corresponds to a statement or command uttered by an occupant that is detected by the voice assist device, and includes a sentiment corresponding to the temperature. The location of the voice assist device may be determined by any suitable methods. For example, the location can be determined from entity data corresponding to an object entity representing the voice assist device, where a data entity containing the location information is associated via a relational entity with the voice assist device object entity. In another example, the location may be determined from one or more attributes in a part (e.g., the header) of the utterance data. In another example, the location may be determined from GPS position information provided by the voice assist device. In another example, the location may be triangulated based on signal strength of the voice assist device to nearby Wi-Fi access points or Bluetooth beacons. In another embodiment, the location may be determined by dead reckoning methods.

The utterance data is analyzed at block 1320 to determine whether the temperature at the location of the voice assist device should be adjusted or left unchanged. For example, the utterance data is analyzed to determine whether the occupant has indicated that he/she is hot (or warm), cold (or chilly), or comfortable. If the utterance data indicates that the occupant is hot, the temperature of the corresponding location should be cooled. If the utterance data indicates that the occupant is cold, the temperature of the corresponding location should be heated. If the utterance data indicates that the occupant is comfortable, the temperature of the corresponding location should be maintained.

The sentiment of the occupant corresponding to the temperature in the analyzed utterance data is used as feedback to calculate a reward based on the state, the first action, and the sentiment at block 1325. For example, a reward scheme is used that considers the possible actions for each state and the occupant feedback received in response to the actions. The reward scheme calculates (or assigns) higher rewards (e.g., points or a numerical value) to those correct actions for a given state as determined by occupant comfort and/or energy consumption reduction.

A second action may be determined to adjust the temperature based at least in part on the calculated reward, and the process may end. In some embodiments, the second action may be determined in order to increase the reward. In some embodiments, each of the first and second actions may be executed irrespective of the temperature set-point. In some embodiments, the zone or space may be heated or cooled depending on the temperature set-point, where the temperature is controlled by changing the temperature set-point. In some embodiments, the temperature set-point is calculated based on historical utterance data.

Configuration of Exemplary Embodiments

While the foregoing describes using various voice assist devices for controlling the temperature in a zone or space, the present disclosure is not limited thereto. For example, in other embodiments, the voice assist devices may provide occupant feedback relating to missing supplies, cleanliness of a zone or space, security issues of a zone or space, requesting information (e.g., directions to a meeting room, scheduling meetings, and the like), etc. In these cases, the voice assist service 650 may analyze the utterance data and may control corresponding ones of the building subsystems 528 or other subsystems depending on the sentiment in the received utterance data (e.g., notifying the office manager or ordering missing supplies, scheduling the janitorial staff to clean the zone or space, requesting security to the zone or space, invoking agent service 638 to map a path to the meeting room, and the like).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A building management system comprising:
a voice assist device;
one or more processors; and
one or more computer-readable storage media communicably coupled to the one or more processors having instructions stored thereon that, when executed by the one or more processors, cause the one or more processors to:
define a state of a zone or space within a building;
control an HVAC system to adjust a temperature of the zone or space corresponding to a first action;
receive utterance data from the voice assist device located in the zone or space;
analyze the utterance data to identify a sentiment relating to the temperature of the zone or space;
calculate a reward based on the state, the first action, and the sentiment;
determine a second action to adjust the temperature of the zone or space based on the reward; and
control the HVAC system to adjust the temperature of the zone or space corresponding to the second action.

2. The system of claim 1, wherein the voice assist device is configured to detect a natural language statement uttered by an occupant at the zone or space, and the utterance data corresponds to the natural language statement.

3. The system of claim 1, wherein the voice assist device is a stationary device or a mobile device.

4. The system of claim 1, wherein the second action is determined to increase the reward.

5. The system of claim 4, wherein each state defines a condition of the zone or space including at least an occupancy status of the zone or space, a current temperature of the zone or space, and a temperature set-point of the zone or space.

6. The system of claim 5, wherein the voice assist device is configured to detect the occupancy status of the zone or space.

7. The system of claim 5, wherein each of the first and second actions include one of turning heat on, turning heat of, turning cooling on, or turning cooling off.

8. The system of claim 7, wherein each of the first and second actions are executed irrespective of the temperature set-point.

9. The system of claim 1, wherein each of the first and second actions includes changing a temperature set-point of the zone or space, and the HVAC system adjusts the temperature of the zone or space based on the changed temperature set-point.

10. The system of claim 9, wherein the temperature set-point of the second action is determined to increase the reward.

11. A method for controlling an HVAC system, comprising:
defining, by one or more processors, a state of a zone or space within a building;
controlling, by the one or more processors, an HVAC system to adjust a temperature of the zone or space corresponding to a first action;
receiving, by the one or more processors, utterance data from a voice assist device located in the zone or space;
analyzing, by the one or more processors, the utterance data to identify a sentiment relating to the temperature of the zone or space;
calculating, by the one or more processors, a reward based on the state, the first action, and the sentiment;
determining, by the one or more processors, a second action to adjust the temperature of the zone or space based on the reward; and
controlling, by the one or more processors, the HVAC system to adjust the temperature of the zone or space corresponding to the second action.

12. The method of claim 11, further comprising detecting, by the voice assist device, a natural language statement uttered by an occupant at the zone or space, and the utterance data corresponds to the natural language statement.

13. The method of claim 11, wherein the voice assist device is a stationary device or a mobile device.

14. The method of claim 11, wherein the second action is determined to increase the reward.

15. The method of claim 13, wherein each state defines a condition of the zone or space including at least an occupancy status of the zone or space, a current temperature of the zone or space, and a temperature set-point of the zone or space.

16. The method of claim 15, further comprising, detecting, by the voice assist device, the occupancy status of the zone or space.

17. The method of claim 15, wherein each of the first and second actions include one of turning heat on, turning heat of, turning cooling on, or turning cooling off.

18. The method of claim 17, wherein each of the first and second actions are executed, by the HVAC system, irrespective of the temperature set-point.

19. The method of claim 11, wherein each of the first and second actions includes changing a temperature set-point of the zone or space, and the HVAC system adjusts the temperature of the zone or space based on the changed temperature set-point.

20. The method of claim 19, wherein the determining of the second action comprises determining the temperature set-point to increase the reward.

\* \* \* \* \*